(12) United States Patent
Crabtree et al.

(10) Patent No.: US 8,535,404 B2
(45) Date of Patent: Sep. 17, 2013

(54) MEMBRANE-FREE FILTER AND/OR INTEGRAL FRAMING FOR FILTER

(75) Inventors: LaMonte A. Crabtree, LaGrange, KY (US); Mike Harriman, Louisville, KY (US); Mike Raider, Louisville, KY (US)

(73) Assignee: Clarcor Air Filtration Products, Jeffersonville, IN (US)

( * ) Notice: Subject to any disclaimer, the term of this patent is extended or adjusted under 35 U.S.C. 154(b) by 365 days.

(21) Appl. No.: 12/813,603

(22) Filed: Jun. 11, 2010

(65) Prior Publication Data

US 2010/0313760 A1 Dec. 16, 2010

Related U.S. Application Data

(60) Provisional application No. 61/186,621, filed on Jun. 12, 2009.

(51) Int. Cl.
*B01D 29/07* (2006.01)
*B01D 35/31* (2006.01)

(52) U.S. Cl.
USPC ............... 55/385.6; 55/497; 55/502; 55/521; 55/528; 55/DIG. 31; 55/DIG. 39

(58) Field of Classification Search
USPC ............... 55/385.6, 497, 502, 521, 527, 528, 55/DIG. 31, DIG. 39; 96/66, 67, 69
See application file for complete search history.

(56) References Cited

U.S. PATENT DOCUMENTS

| | | |
|---|---|---|
| 3,987,258 A | 10/1976 | Tsutsui et al. |
| 4,375,718 A | 3/1983 | Wadsworth et al. |
| 4,714,647 A | 12/1987 | Shipp, Jr. et al. |
| 4,833,026 A | 5/1989 | Kausch |
| 4,877,433 A | 10/1989 | Oshitari |
| 4,902,423 A | 2/1990 | Bacino |
| 4,949,218 A | 8/1990 | Blanchard et al. |
| 5,290,447 A | 3/1994 | Lippold |
| 5,395,411 A | 3/1995 | Kobayashi |
| 5,409,419 A | 4/1995 | Euchner et al. |

(Continued)

FOREIGN PATENT DOCUMENTS

| | | |
|---|---|---|
| DE | 19755466 A1 | 6/1999 |
| DE | 198 33 247 A1 | 2/2000 |

(Continued)

OTHER PUBLICATIONS

IBM, Ventilation System for Data Processing Systems, Technical Disclosure Bulletin, Feb. 1975, 2 pages.

(Continued)

*Primary Examiner* — Richard L Chiesa
(74) *Attorney, Agent, or Firm* — Reinhart Boerner Van Deuren P.C.

(57) ABSTRACT

A filter for an electronics cooling unit of a telecommunications base station, the electronics cooling unit adapted to receive fresh air into a housing of the cooling unit through an opening communicating with the external environment. The filter includes a structural support configured to be mounted to said housing, a gasket sealingly engaging the structural support and adapted to engage the housing; and a filter media supported by the structural support, the filter media being free of a membrane type layer and including a fiber entanglement selected to prevent ingress of water sufficient to pass a salt fog test consistent with GR-487-CORE and in accordance with ASTM B 117.

30 Claims, 16 Drawing Sheets

(56) References Cited

U.S. PATENT DOCUMENTS

| | | | |
|---|---|---|---|
| 5,411,576 A * | 5/1995 | Jones et al. | 95/57 |
| 5,462,586 A | 10/1995 | Sugiyama et al. | |
| 5,507,847 A | 4/1996 | George et al. | |
| 5,573,562 A | 11/1996 | Schauwecker et al. | |
| 5,646,823 A | 7/1997 | Amori | |
| 5,650,451 A | 7/1997 | Yagi et al. | |
| 5,804,014 A | 9/1998 | Kähler | |
| 5,814,405 A | 9/1998 | Branca et al. | |
| 5,886,296 A | 3/1999 | Ghorbani et al. | |
| 5,901,034 A | 5/1999 | Füglister | |
| 5,922,096 A * | 7/1999 | Stemmer | 55/483 |
| 6,117,202 A * | 9/2000 | Wetzel | 55/385.2 |
| 6,123,076 A | 9/2000 | Roberts et al. | |
| 6,218,000 B1 | 4/2001 | Rodolf et al. | |
| 6,419,871 B1 | 7/2002 | Ogale | |
| 6,568,540 B1 | 5/2003 | Holzmann et al. | |
| 6,589,308 B1 | 7/2003 | Gianelo | |
| 6,685,833 B2 | 2/2004 | Lippold | |
| 6,709,480 B2 * | 3/2004 | Sundet et al. | 55/499 |
| 6,780,217 B1 | 8/2004 | Palmer | |
| 6,885,554 B1 | 4/2005 | Reeck et al. | |
| 7,070,641 B1 * | 7/2006 | Gunderson et al. | 55/497 |
| 7,244,291 B2 * | 7/2007 | Spartz et al. | 96/69 |
| 2004/0112023 A1 | 6/2004 | Choi | |
| 2004/0163372 A1 * | 8/2004 | Nguyen | 55/497 |
| 2004/0194441 A1 * | 10/2004 | Kirsch | 55/497 |
| 2005/0016267 A1 | 1/2005 | Doorhy et al. | |
| 2005/0022490 A1 * | 2/2005 | Huang et al. | 55/486 |
| 2005/0108996 A1 | 5/2005 | Latham et al. | |
| 2007/0039300 A1 | 2/2007 | Kahlbaugh et al. | |
| 2007/0084786 A1 | 4/2007 | Smithies | |
| 2007/0175192 A1 | 8/2007 | Niakan et al. | |
| 2007/0184256 A1 | 8/2007 | Okada et al. | |
| 2007/0220852 A1 | 9/2007 | Lifshutz et al. | |
| 2008/0022642 A1 | 1/2008 | Fox et al. | |
| 2008/0202078 A1 | 8/2008 | Healey et al. | |
| 2009/0199717 A1 | 8/2009 | Green et al. | |
| 2009/0266759 A1 | 10/2009 | Green | |
| 2010/0181249 A1 | 7/2010 | Green et al. | |

FOREIGN PATENT DOCUMENTS

| | | | |
|---|---|---|---|
| DE | 10 2004 041 387 A1 | 3/2006 | |
| EP | 0407566 A1 | 1/1991 | |
| EP | 0395331 A1 | 10/1991 | |
| EP | 1040738 A1 | 10/2000 | |
| EP | 1266681 A2 | 12/2002 | |
| EP | 1 098 692 B1 | 5/2003 | |
| EP | 1674144 A1 | 6/2006 | |
| EP | 1 750 493 A1 | 2/2007 | |
| JP | Hei2-17852 | 2/1990 | |
| JP | 04-338794 | 11/1992 | |
| JP | 5-245325 A * | 9/1993 | 55/DIG. 39 |
| JP | 06-031130 | 2/1994 | |
| JP | H-10-190269 | 7/1998 | |
| WO | WO 2007/006580 A1 | 1/2007 | |
| WO | WO 2009/033143 A1 | 3/2009 | |

OTHER PUBLICATIONS

Cambridge Filter (China) Co., Ltd., In the performance of the filter, pages printed from website, date last visited Jun. 29, 2010, 4 pages, http://translate.googleusercontent.com/translate c?hl=en&sl=zh-CN &u=http://www.cambr . . .

Gore, Cooling Filters, pages printed from website, date last visited Feb. 13, 2009, 2 pages, http://www.gore.com/en_xx/products/filtration/cooling/index.html.

Gore, Why use membrane cooling filters versus non-membrane filters?, page printed from website, date last visited Feb. 13, 2009, 1 page, http://www.gore.com/en_xx/products/filtration/cooling/cooling_versus.html.

Gore, Filtration Glossary, pages printed from website, date last visited Feb. 17, 2009, 2 pages, http://www.gore.com/en_xx/products/filtration/cooling/cooling_glossary.html.

Gore, Filtration Frequently Asked Questions, page printed from website, date last visited Feb. 17, 2009, 1 page, http://ww.gore.com/en_xx/products/filtration/cooling/cooling_faqs.html.

Gore, Cooling Filters increase reliability and lower costs, pages printed from website, date last visited Feb. 17, 2009, 2 pages, http://www.gore.com/en_xx/products/filtration/cooling/cooling_why_use2.html.

Gore, Applications Performance and Construction Materials, pages printed from website, date last visited Feb. 17, 2009, 1 page, http://www.gore.com/en_xx/products/filtration/cooling/cooling_applications_performance . . .

Gore, Standards Compliance, pp. printed from website, date last visited Feb. 17, 2009, 1 page, http://www.gore.com/en_xx/products/filtration/cooling/cooling_standards_compliance.html.

Gore, Cooling Filters, brochure, known prior to Jun. 11, 2010, 6 pages.

Gore, Cooling Filters, brochure, known prior to Jun. 11, 2010, 2 pages.

Gore, Cooling Filters, brochure, known prior to Jun. 11, 2010, 4 pages.

U.S. Appl. No. 12/813,655, filed Jun. 11, 2010, Crabtree et al.
U.S. Appl. No. 12/271,322, filed Nov. 14, 2008, Green et al.
U.S. Appl. No. 12/357,499, filed Jan. 22, 2009, Green et al.
U.S. Appl. No. 12/428,232, filed Apr. 22, 2009, Green.

* cited by examiner

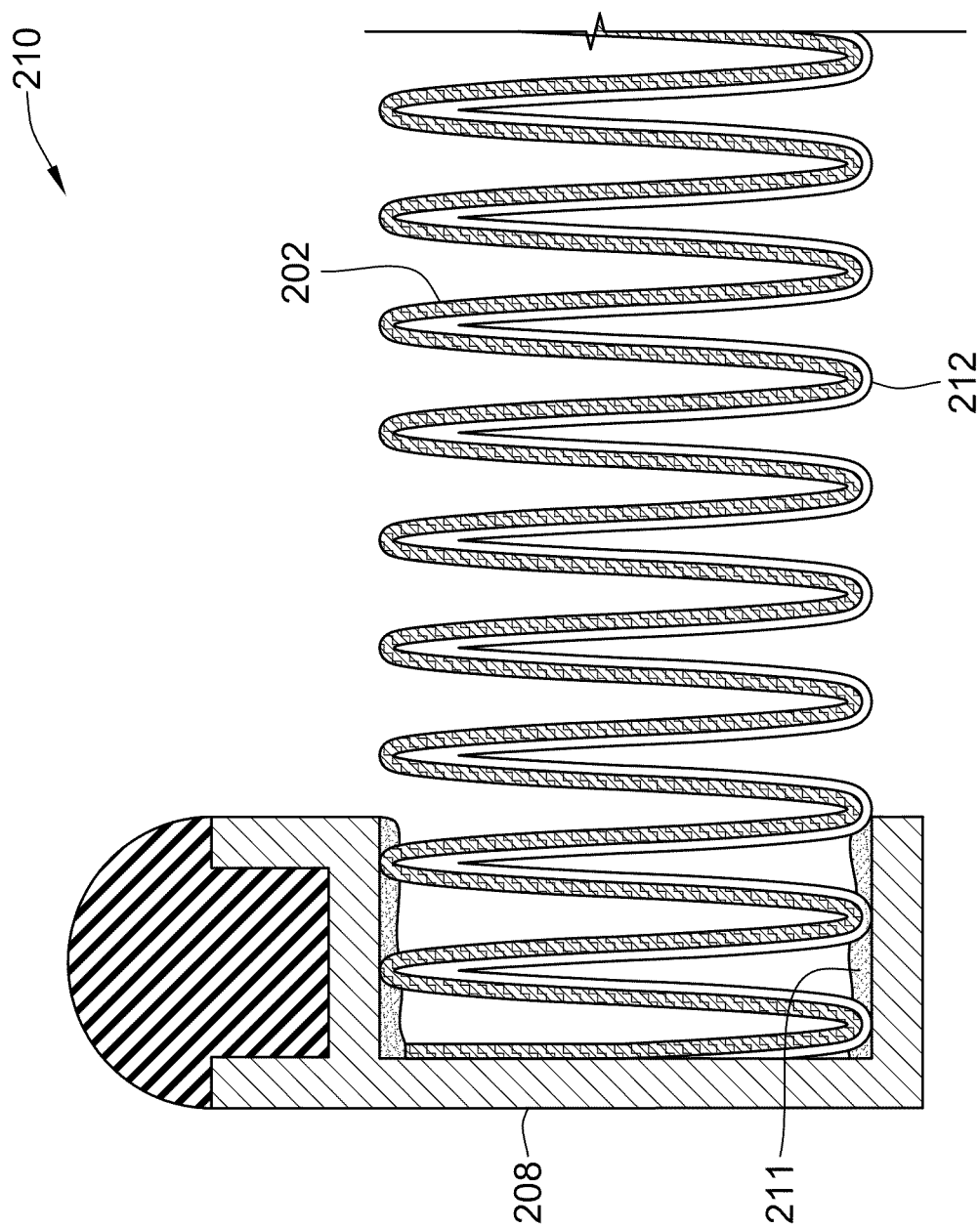

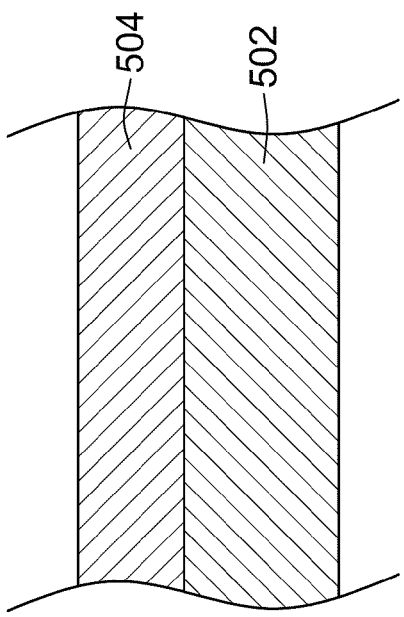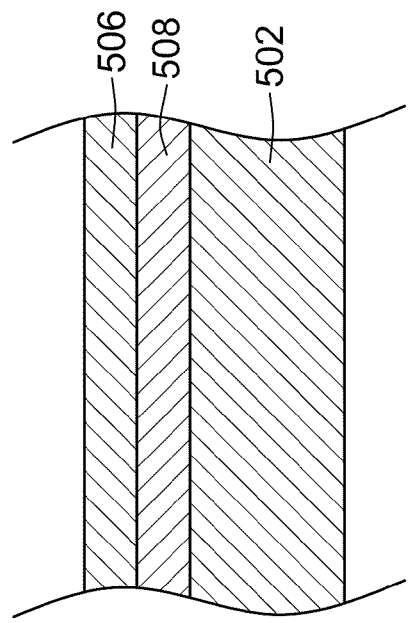

MEMBRANE-FREE FILTER AND/OR INTEGRAL FRAMING FOR FILTER

CROSS REFERENCE TO RELATED APPLICATIONS

This Application claims the benefit of U.S. Provisional Application Ser. No. 61/186,621 filed Jun. 12, 2009, the entire teachings and disclosure of which are incorporated herein by reference thereto.

FIELD OF THE INVENTION

The present invention generally relates to filtration systems and more particularly to air filter systems for filtering outside air that prevents ingress of dust, water, and/or other contaminants into sensitive electronics housings and telecommunications filtration/electronics systems incorporating such air filters.

BACKGROUND OF THE INVENTION

As one background example of an application or operating environment, highly sensitive, and valuable, telecommunications equipment, such as that used in the operation of mobile telephone base stations and radio towers is often housed in outdoor housings. These housings may vary significantly in size and construction. Some are built on the ground, equipped with doors, and are large enough to shelter the repair and maintenance personnel who service the equipment. Other housings are smaller and may be located off of the ground and part of the way up and mounted directly to a radio tower such as metal casing mounted to the radio tower. Therefore, there are different ways to provide for the telecommunication base station with different types of telecommunication electronics housings. These telecommunication base stations are often located all over the world, many in quite remote locations.

Because the electronic equipment housed in these housings typically use high levels of electrical current during operation, a significant amount of heat may be generated within the housing. To ensure that the continued operation of this highly sensitive and valuable equipment is not adversely affected by excessive heat buildup, the housing may include some type of cooling system to keep the temperature in the housing within an acceptable range. Such a cooling system may include one or more fans designed to pull in cool air from the atmosphere outside of the housing, while exhausting the warm air inside the housing. Alternatively, some housings may simply provide a flow path for cool air from the outside through the housing to cool the electronic equipment housed therein.

Due to the aforementioned sensitivity of the electronic equipment housed in these housings, it is important or highly desirable that the housings prevent outside elements, such as water, dirt, and dust that might harm the equipment from entering the housing. In some systems, membrane filters are used to ensure the equipment is adequately protected from water, dirt, and dust particles. These systems are generally sealed housings, but for an opening for the membrane filter and outlet port for exhausting internal air. Other systems are completely sealed and known as heat exchanger systems.

It should be recognized that these systems may operate in a wide range of different climates and environments depending upon where a given telecommunication base station and radio tower is located. For example, many of these telecommunication base stations are provided near an ocean and therefore can be subject to mist or fog containing salt, sometime referred to as "salt fog". Accordingly, operators of such telecommunication base stations will typically have certain requirements for the protection of their electronic equipment contained within the base stations. In fact, one typical test employed is known as the "salt fog test", in which the entire cabinet (in other words, the housing with the filter mounted therein) shall be placed in an environmental test chamber and exposed to a salt fog spray for 30 days, consistent with GR-487-CORE and in accordance with ASTM B 117. During this test, the fans are operated to draw air flow including the salt fog into the filter element. Given the small size of moisture particles in salt fog and fluid nature of water (water being in liquid form is readily deformable and can expand or contract in size easily; unlike traditional dust particles, which are solids and are considered to have a fixed size), and the complications associated with salt, it can be seen that it would be quite difficult to prevent the passage of moisture through the filter media with a fan drawing air into the housing. This is especially so when it is desirable to move air into the housing free of mist/fog or other water, dust and particles so as to cool the inside of the housing. Therefore, an overly restrictive filter would not be desirable. Yet further, temperature variations and temperature fluctuations can further create difficulties.

While one background example is discussed in some detail above, it should be recognized that beyond the telecommunications industry, there are numerous different applications for where it is desired to vent a housing enclosure with outside air that may carry dust, moisture and/or salt, without carrying such dust, moisture and/or salt into the housing enclosure. For example, manufacturing facilities, clean rooms, material storage warehouses, and numerous other electronic housings also are vented with filtered external air. Accordingly, various different venting arrangements and environments are known.

The prior art attempts to providing membrane filter elements for telecommunication base stations and other such applications are disclosed in U.S. Pat. No. 6,885,554 to Reeck et al. (assigned in part to W.L. Gore & Associates GMBH) and EP 1,750,493 A1 to W.L. Gore & Associates GMBH (herein "Gore"), both of which are incorporated by reference to the extent not inconsistent with the present disclosure. Other earlier patents also disclose membrane filter elements for such water tight housing enclosures housing electronics and the like, such as U.S. Pat. No. 6,885,554 to Kobayashi; JP Publication No. 04-0338794 to Kenji; JP H06-031130 to Tsutsumi; U.S. Pat. No. 5,507,847 to George; U.S. Pat. No. 5,901,034 to Fuglister; and EP 0,395,331 to Ichiyasu.

However, usually such prior attempts disclose only and are restricted to using "membrane" type filters, which according to earlier patent records of Gore (e.g. U.S. Pat. No. 6,218, 000), that apparently comprise a process of extruding a thin rectangular tape film of PTFE (aka "Teflon®") from a pellet and then stretching the film to create pore structures within the film. While commercially available membrane type filters® from Gore are currently believed to pass the salt fog test standard, these filters like the patents require a special membrane material, which are restrictive due to the tight film structure and load very quickly due to the membrane's surface loading nature, thereby reducing lifespan and reducing airflow quickly over time due to increased restriction. Different environments will experience different types of dust particles including different gradient densities of different particle sizes. As such, these types of filters may not be optimal for many different climates and operational environments that may exist across the globe. There also is some discussion of non-membrane materials with water repellency such as in U.S. Pat. No. 6,885,554 to Kobayashi, which mentions porous membranes or Teflon, but alternatively water repellant fiber materials of various sorts.

Other prior art attempts for cooling watertight enclosures as mentioned in the '554 patent are sealed heat exchanger systems that utilize a heat exchanger to cool inside air as opposed to inletting fresh outside air into the electronics housing. These types of systems however do not employ a filter, as fresh air is not allowed to penetrate the housing. Instead, separate exterior and interior fans circulate air through the heat exchanger. These systems are thus typically more expensive and further are subject to the efficiency of the heat exchanged in the heat exchanger unit.

Various industry test standards have developed for telecommunications housings or other enclosures incorporating cooling systems, that are applied to both heat exchanged units as well as membrane type filtration units. These may include for example a wind driven rain intrusion test, a rain intrusion test (no wind, but heavy rainfall), a lawn sprinkler test, a weather tightness and dust intrusion test, wind resistance test, impact resistance test, fire resistance test (e.g. due to brush fires), and a corrosion resistance or salt fog test. It is the salt fog test that often proves to be most difficult as a filter may need to pass 30 days of being subject to salt fog. For example according to one test, the entire cabinet shall be placed in an environmental test chamber and exposed to a salt fog spray for 30 days, consistent with GR-487-CORE and in accordance with ASTM B 117. Fans, used to circulate outside air (i.e., heat exchanger fans), are in operation during this exposure. Only a filter that prevent moisture (carrying salt) from breaking through the filter element and into the cabinet survives this rigorous test. Other tests for filters that present serious difficulties are the simulated rain tests.

The present invention is directed toward improvements over the state of the art.

BRIEF SUMMARY OF THE INVENTION

The present invention has several aspects that may be claimed and stand as patentable individually or in combination including but not limited to the following.

Generally, many aspects of the present invention are directed toward a membrane free filter for the telecommunications industry that can both dust load and prevent moisture intrusion according to rigorous testing standards and protocols demanded by many within the industry. The tight fiber entanglement to provide certain capillary action and surface tension characteristics. A separate aspect may relate to an integrally formed frame of polymeric material, such as foamed urethane, plastisol or the like, that may integrally provide a seal. This aspect could also be used with membrane media for electronics housings as well.

In an aspect of the invention, an apparatus includes a telecommunication station having telecommunications electronic components, a cooling unit including a housing enclosing the telecommunications electronic components therein. The housing has an air inlet receiving air from an outside air environment. The apparatus further includes a filter element arranged to filter air entering through the air inlet. The filter element is free of a membrane layer. The filter element includes a fiber entanglement preventing ingress of moisture and dust entrained in the air to prevent fouling of the telecommunications electronic components.

In another aspect of the invention, a filter that includes a water and corrosion resistant rectangular frame adapted to provide for a panel filter, a rectangular gasket sealingly engaging the rectangular frame, and a filter media sealingly mounted into the rectangular frame. The filter media has a pleat depth of at least about 0.50 inch and is a composite media free of a membrane layer. The filter media further includes a carrier substrate layer and an efficiency fiber entanglement laminated thereto. The efficiency fiber entanglement includes hydrophobic fibers to provide the composite media with greater than a MERV 14 rating.

In yet another aspect of the invention, a method of protecting telecommunications equipment includes: (a) housing electronic telecommunications equipment in an housing having an air inlet; and (b) positioning a filter in the air inlet, the filter having a sealing member to seal against the housing. The positioned filter includes a depth-loading media layer configured to repel water, combined with a permeable carrier media layer. This combination is free of any membrane layers, and is a composite filter media that has at least a MERV 16 rating with a pore size distribution such that greater than 50% of the pores are from 5 to 8 microns in diameter, greater than 20% of the pores are from 8 to 11 microns in diameter, and greater than 15% of the pores are less than 6 microns in diameter.

In still another aspect of the invention, an apparatus includes a cooling unit including a housing enclosing the telecommunications electronic components therein. The housing has an air inlet receiving air from an outside air environment, and a filter element arranged to filter air entering through the air inlet. The filter element is configured to prevent the ingress of moisture and dust entrained in the air to prevent fouling of the telecommunications electronic components. The filter element includes a filter media, and a border frame molded of a polymeric material that extends around a periphery of the filter media. The border frame also integrally provides a seal between the filter element and the cooling unit.

Yet in another aspect of the invention, a filter is configured for use in a telecommunications housing that encloses telecommunications electronics therein, in which the housing exposed to an outside environment. The filter includes a generally rectangular frame, a seal adapted to provide a seal between the frame and the housing, and a pleated filter media extending within and across the frame to provide a pleated filter. The pleated filter medium includes a selected depth-loading filter medium having at least one layer adapted to filter mist and dust from air that may occur in the outside environment sufficiently to protect the telecommunications electronics from mist and dust.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2A is a cross-section of the filter element according to an alternative embodiment similar to FIG. 2, but where the filter element includes an additional scrim material or alternatively metal or plastic mesh co-pleated along the upstream side to additional provide a surface filtration pre-filter;

FIG. 10 is a schematic diagram illustrating a cross-section of the composite filter media according to an embodiment of the invention;

FIG. 10A is a schematic diagram illustrating a cross-section of the composite filter media according to another embodiment of the invention;

DETAILED DESCRIPTION OF THE INVENTION

Figure 1:
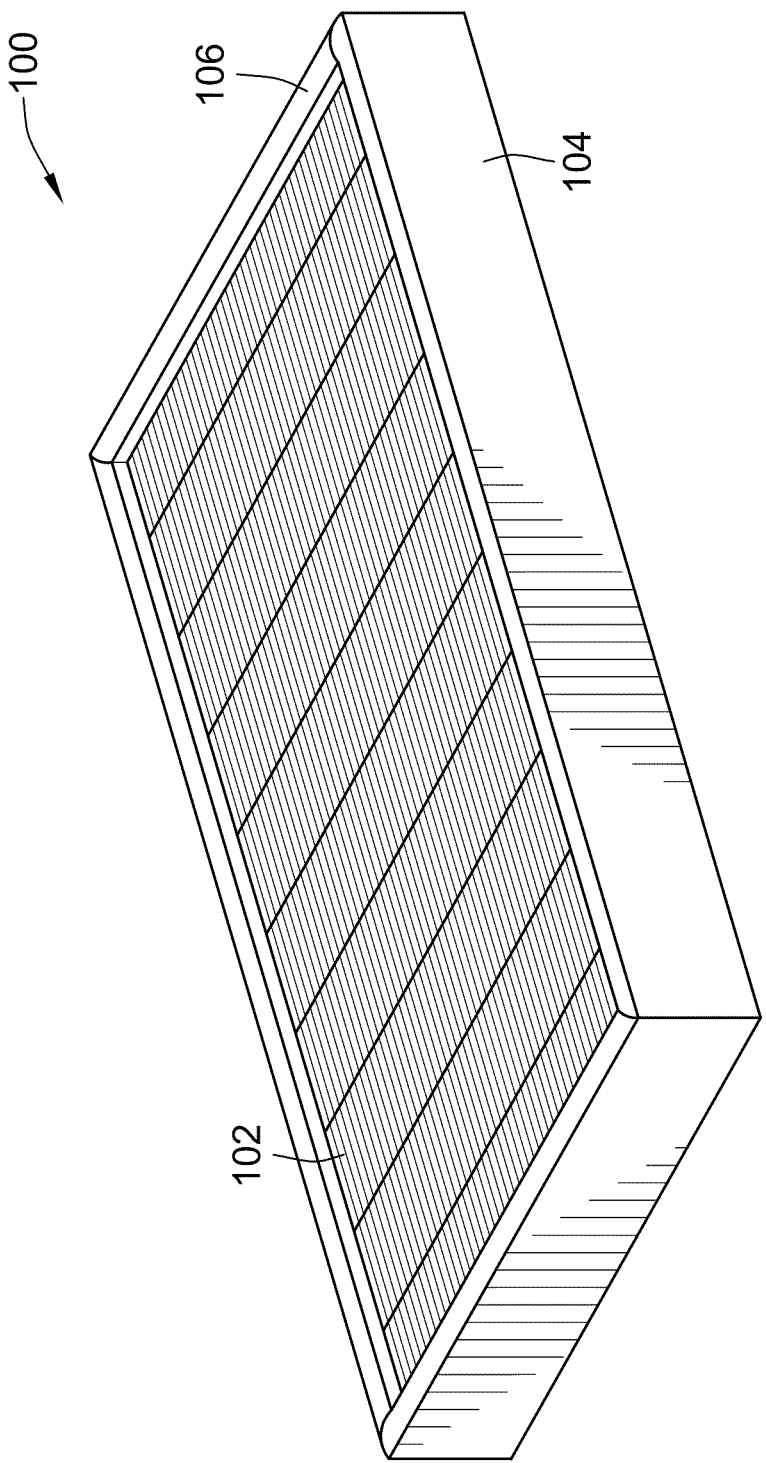
FIG. 1 is a perspective illustration of a filter element according to an embodiment of the invention.

FIG. 1 illustrates a filter element 100 according to an embodiment of the invention. The filter element 100 includes a composite filter media 102 attached to a structural support shown as a generally rectangular frame 104 to provide for a panel filter. The structural support such as in the form of the frame 104 may be constructed of aluminum, stainless steel, foamed urethane, plastic, or some other suitable material that is resistant to rust, water damage, thermal contraction and expansion, and other environmental effects to which the filter element 100 may be subjected, including salt, which may occur in coastal regions near oceans. While a panel filter is illustrated and preferred form for telecommunications filtration applications, the structural support may take other forms such as an annular structural support member that would support a cylindrical or oval filter media arrangement for example, that could provide for radially inward or radially outward flow instead of axially in line flow as with a panel filter.

The filter element 100 also includes a generally rectangular seal 106 is sealingly engaged with the frame 104 and preferably mounted and carried thereby for engagement and sealing against a housing. The seal 106 is typically an elastomeric material such as urethane or can be made from some other rubber-like or elastomeric seal material suitable to create an airtight seal between the frame 104 and the housing into which the filter element 100 is mounted. The gasket material will axially compress (e.g. perpendicular to the plane of the panel filter) when mounted to the housing 302 (in FIG. 3) to provide an axial compression seal. Other seals are also contemplated to include radial seals, wiper seals and deflection seals and pinch gaskets.

It is also possible for the seal of the filter to be provided by the housing or a separate seal member that engages a surface of the seal support, however in that instance, the seal member may not be changed out at filter change intervals, which is undesirable due to eventual seal fatigue or other issues relating to seal integrity and reliability. In all such instances discussed above (including the separately formed but permanently affixed gasket, the integral and unitarily fatined gasket, and the separate gasket that is separable from the frame and may be mounted to the housing), the gasket sealingly engages the frame to provide a seal therebetween and prevent leakage between the housing 302 and the seal.

While, in some embodiments, the composite filter media 102 may be a flat sheet, in the embodiment shown, the composite filter media 102 is most preferably pleated, thereby increasing the surface area of the composite filter media 102 within the frame 104 for a given volume or allotted space. A perimeter of the composite filter media 102 is sealingly attached, typically using an adhesive, to an interior surface of the frame 104, which provides an internal perimeter seal between the filter media 102 and the frame 104; this prevents short circuiting of unfiltered air between the frame 104 and the filter media 102. For filter elements configured to operate in high-flow-rate environments, spacers, such as plastic finger spacers or hot-melt adhesives spaced at regular intervals, may be placed at regular intervals along the pleated filter media to add structural rigidity and prevent deformation of the media. In addition to being pleated, the composite filter media 102 may also be embossed to add structural rigidity, to further increase surface area, and to increase amount of media that can be manipulated into a volume for a panel filter. A method of embossing filter media is described in U.S. Pat. No. 6,685,833. U.S. Pat. Nos. 5,290,447, 5,804,014, and DE 19755466 A1 also describe methods of embossing that, in some embodiments, may be applied to the composite filter media of the present invention. Each of these patents are incorporated by reference in their entireties, as these or other pleating and embossing technologies may be used.

Figure 2:
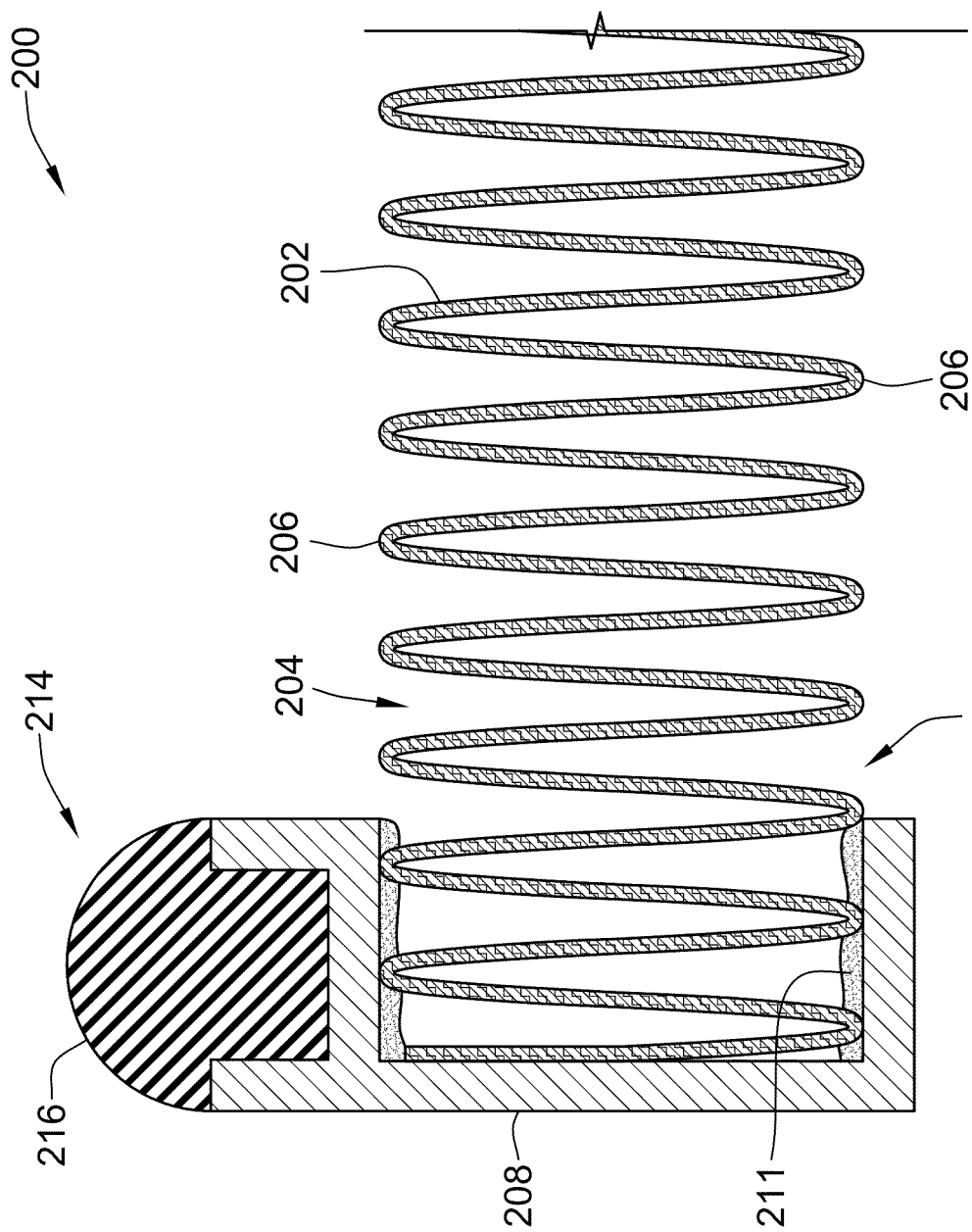
FIG. 2 is a cross-section through the filter element of FIG. 1 according to an embodiment of the invention utilizing a rigid metal or pre-formed frame.
Figure 3:
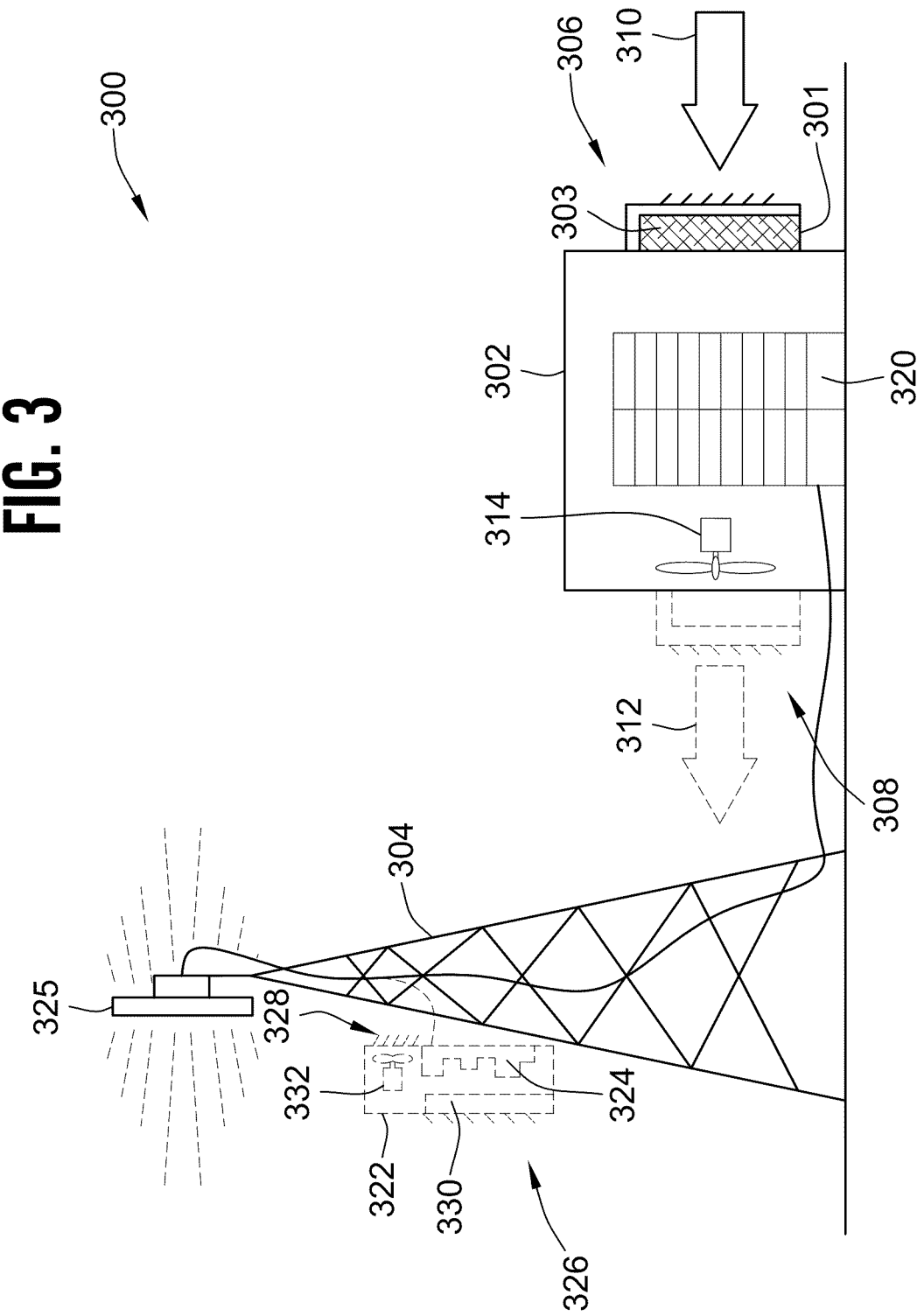
FIG. 3 is a schematic illustration of a telecommunications base station incorporating embodiments of the invention including different types of housings including a stand alone enclosure and a tower mounted cabinet, each of which incorporates filter elements according to embodiments of the present invention.

In respective embodiments of the invention for telecommunications cooling filter applications, the pleat depth is typically at least about 0.50 inch, and may be two inches, four inches, six inches, or 12 inches ("about" is used considering that the depth is often measured by the available depth of the frame, and usually some variance, often slightly less than the available depth is provided). As shown in FIG. 2, the filter media 202 is pleated to include a plurality of pleats 204 with pleated tips 206, the pleat tips 206 extending substantially vertically and in substantially horizontally spaced relation so as to act to drain moisture between pleats 204 through gravity. Similarly, as shown in FIG. 3, the filter location on the housing 302 (often a box-like cabinet) is preferably not formed in the top or bottom panel, but in one of the four side panels extending between top and bottom to facilitate a vertical orientation of the filter 200 in the case of a panel filter (e.g. where the plane of the panel filter is substantially vertical—meaning it is vertical as shown or includes enough vertical component even if at a diagonal to facilitate gravitational drainage). Preferably, when mounted, the pleats 204 run substantially vertically so as to create vertical drainage channels between pleat tips 206, but it is contemplated that, in some configurations, the filter element will be installed such that the pleats run horizontally. To ensure a predetermined mounting orientation in some preferred embodiments, a non-square configuration and/or special mounting interface orientation feature between housing 302 and filter 200 (that could be used with square configuration too), to ensure the pleats 204 run up and down in a substantially vertical manner to better facilitate drainage.

The filter media 202 is attached to a frame 208 using an adhesive 211. The frame may be made of a non-corrosive metal such as aluminum or of plastic. In an embodiment of the invention, the frame 208 has a first C-shaped channel 213, having three sides, sized to accept the pleated filter media 202. The adhesive 210 may be placed on at least two of the three sides of the first C-shaped channel 213 in which the filter media 202 is seated to hold the filter media 202 securely in the frame 208. The frame 208 has a second C-shaped channel 214 configured to hold a gasket seal 216.

Also, for respective embodiments of the invention for telecommunications cooling filter applications, panel filters may, in some embodiments, have a width of at least about six inches and a length of at least about six inches (the width and length may be the same in a square configuration); but will typically have a width of between 2 and 6 feet and a length of between 2 and 6 feet.

Referring to FIG. 3, a filter element 301 with composite filter media 303 is configured to remove particulates and moisture from the air that might adversely affect the operation of the electronic equipment 320. An arrow 310 on the upstream side of the filter element 301 shows particulate-laden air entering the housing 302 through an air inlet 306 that includes the filter element 301. A second arrow 312 shows that the air exits downstream of the filter element 301 as particulate-free air. The physical properties of the composite filter media 303 including efficiency, permeability, pore size distribution, basis weight, thickness, etc. will be discussed below.

FIG. 3 illustrates an environment in which a filter element incorporating any of the embodiments of the invention is typically used. The filter element 301 is configured to be installed in an outdoor housing 302, such as those that might be used in a telecommunications base station 300, for example, at the base of a radio tower 304. The outdoor housing 302, which includes an air inlet 306 and an air outlet 308, is typically configured to house valuable and environmentally sensitive electronic telecommunications equipment 320, which is shown schematically arranged along the air flow between the inlet 306 and the outlet 308. The cooling systems employed in these housings 302 to regulate the temperature therein may include one or more fans 314 which pull cool air from the environment into the housing 302 to cool the equipment 320. "Fan" is meant to include any centrifugal wheel, blower, fan, blade, or other air conveying device that moves air along and through the filter.

At the same time cool air enters the air inlet 306, warm air inside of the housing 302 is exhausted to the outside environment through the air outlet 308. The air outlet 308 may also include a similar filter to that of filter element 301 (albeit much smaller) or a check valve to prevent backflow of unfiltered air during idle or due to pressure differential reasons. However, it is contemplated that some housings, capable of utilizing embodiments of the invention, may have cooling systems that do not use fans to move cooling air from the outside through the housing. For example, some housings may simply be vented through an opening such as the air inlet 306 depicted.

In an alternate embodiment of the invention, a housing 322 (shown in phantom) housing electronic equipment 324 mounted on the radio tower 304, and which may be connected to a transmitter 325 at top of the radio tower 304. This housing 322, which is secured to structural members 327 of the radio tower 304, is significantly smaller than the shed-type housing 302 such that the electronic equipment 324 is serviced from outside of the housing 322. The housing has an inlet 326 and an outlet 328. An inlet 326 and an outlet 328 may have louvered openings configured to block the flow of air into the inlet and from the outlet when the louvers are closed. The louvers can keep water and dust from getting to the filter media of a filter element 330. In an alternate embodiment of the invention, the outlet 328 may also have a filter element (not shown). A fan 330 is configured to move cooling air from the inlet 326 air through the housing 322 and out through the outlet 328.

Whether in the shed-type housing 302 or the tower-mounted housing 322, the pleats in the filter media of filter elements 301, 330 will typically be mounted vertically so that any water trapped in the depths of the pleats is drained away from the bottom of the filter element frame. However, the filter element 301, 330 may be mounted so that the pleats run horizontally.

Figure 4:
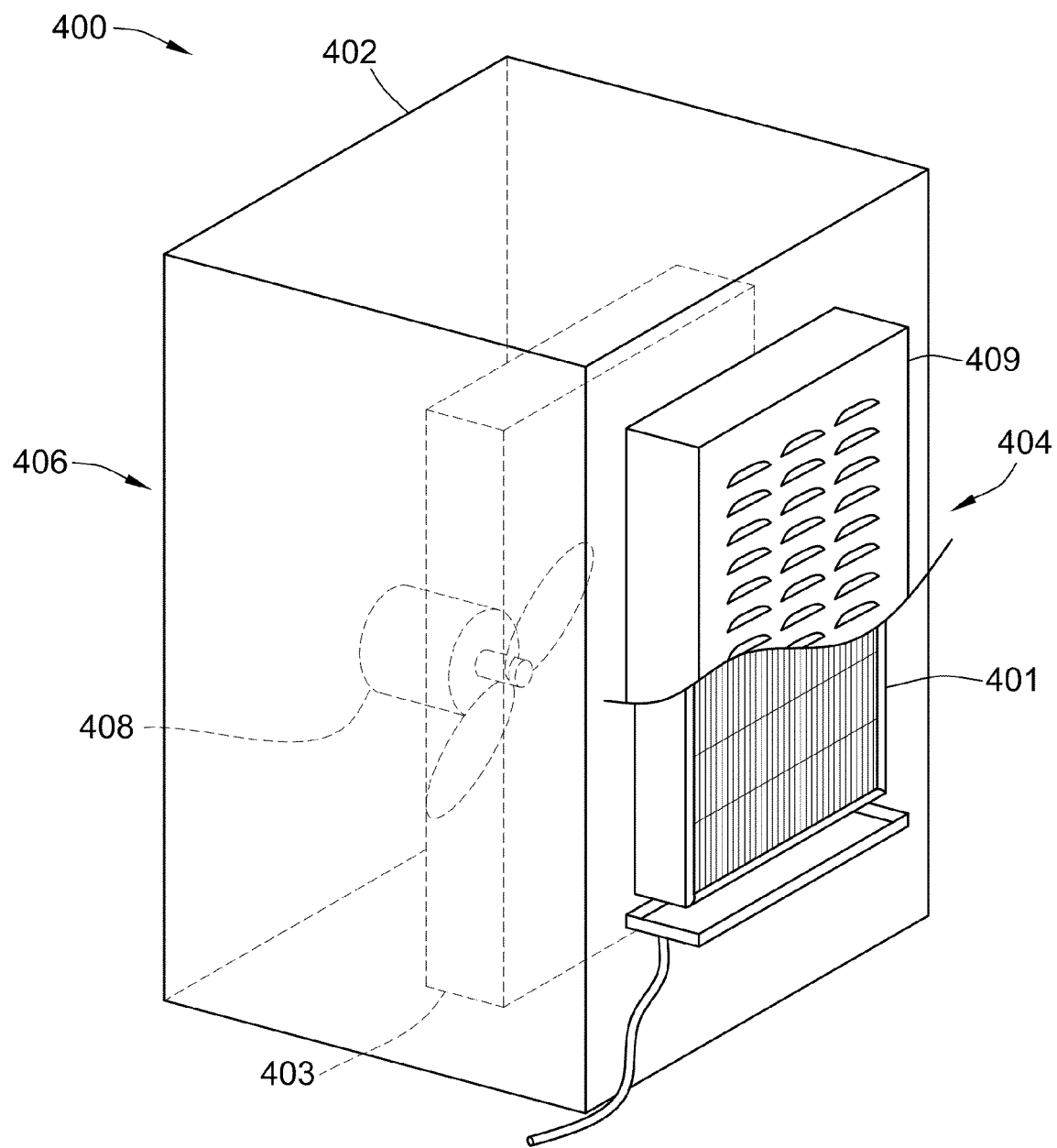
FIG. 4 is a schematic illustration of a fan cooled cabinet incorporating a filter element according to an embodiment of the invention.

FIG. 4 illustrates a fan cooling unit 400 incorporating a filter element 401 in accordance with embodiment of the invention. The fan cooling unit 400 is configured to house electronic components 403 which are sensitive to temperature, moisture, dust, salt, etc. In one embodiment, the fan cooling unit 400 includes a water-tight cabinet 402 with an air inlet 404 and an air outlet 406 formed therein. The cabinet 402 is preferably one that is able to pass the various tests mentioned to prevent intrusion of water and form a watertight enclosure in conjunction with the filter element 100. A fan 408 draws air in through the air inlet 404 to cool the electronic components 403 (shown schematically) and exhausts the warm air through the air outlet 406. In alternate embodiments of the invention, the fan cooling unit 400 includes multiple fans. The filter element 401 is placed in the air inlet 404 to remove moisture and particulates from the incoming air. A second filter element (not shown) may also be placed in the air outlet 406 to ensure that moisture and particulates do not enter the fan cooling unit 400 through the air outlet 406. The fan cooling unit 400 may include some type of protective covering, such as a louvered panel 409, for the filter elements 401 to increase the useful life thereof. The louvered panel 409 also deflects and drains rain away from the filter element 401 and along the outside of the housing 402 to attempt to limit moisture contact with the filter element 401.

As will be explained more fully below, the composite filter media 102 used in the filter elements 100 of the fan cooling unit 400 and housing 302 of telecom base station 300 is free of a membrane material, in accordance with the invention. Embodiments of the present invention instead utilize fiber entanglements such medias including high efficiency melt blown medias and/or other such fiber entanglements as discussed herein. Medias as discussed herein can also provide substantial benefit including lower restriction and/or greater dust holding capacity.

To get such fiber entanglements to work that often have a more random and more open structure throughout the depth, the capillary action and/or surface tension of water was realized as an important feature to preventing moisture from flowing through such fiber entanglements. Capillary action is the tendency of a liquid to rise in narrow tubes or be drawn into small pores as may be created through a fiber structure of the filter media. Sponges or paper towels work through capillary action for example. The mutual attractive force that exists between like water molecules is known as cohesion and is responsible for holding droplet of water together. Cohesion is closely related and produces "surface tension" which may allow objects that are more dense than water to be supported on the water surface without sinking. When attractive forces of water with an unlike material exists, that is often referred to as adhesion. There thus is also an interplay between the types of fibers selected as well as the size of the pores in the media. Sufficiently small pores prevent ingress of water due to capillary action (e.g. a sufficiently small tube will trap and/or suck water into the tube and overcome the gravitational effects of water).

Melt blown medias for example have considerable depth for example with a varied pore structure developed throughout the depth. Further, to facilitate reasonable air flow, the media should be sufficiently open to facilitate enough cooling. Yet further, fiber entanglements including for example a plurality of different virtually infinite length fibers are subject to deformation, stretching and the like that can alter pore size and/or the filtration performance.

To avoid use of membrane materials, various filtration characteristics are noted to be germane to preventing ingress of moisture and satisfying rigorous testing standards often required in the telecommunications industry, particularly the salt fog test, while at the same time facilitating air flow so as to not be overly restrictive, and at the same time providing sufficient dust loading capacity, and in fact, what is believed to be much greater capacity throughout the depth of the media, as compared to that of membranes that are characterized as surface loading medias and thus may tend to clog quickly on the surface of the media.

Figure 5:
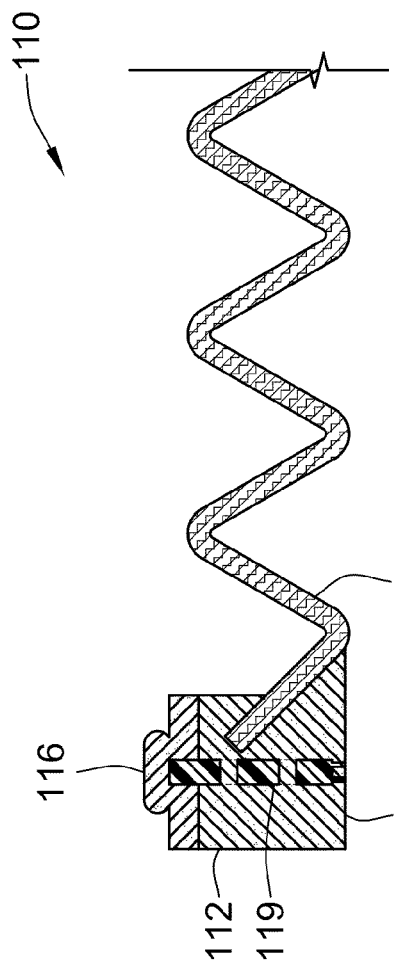
FIG. 5 is a cross-sectional view of a filter element with a urethane frame and seal according to an embodiment of an invention.

In the case of a foamed urethane rectangular frame (or perhaps a plastic frame with a thin web of plastic material providing a seal), the seal may be integrally formed with the frame as part of the same pool of urethane used to mold the frame and the seal as a single unitary component part. It is contemplated that an embodiment of invention includes a filter element with an integral frame/seal member made of a dual-durometer urethane foam material where a relatively soft urethane foam is molded in combination with a harder urethane foam. FIG. 5 illustrates such a filter element 110. The frame 112 has a relatively hard inner urethane portion 114 molded in combination with a softer urethane portion 116, which is configured to form a seal with the housing 302 (shown in FIG. 3). The urethane foam is molded around an end of composite media 118, thus creating a strong bond between composite media 118 and frame 112. In an alternate embodiment, the filter element 110 includes an integral, single-durometer urethane foam frame/seal.

Figure 6:
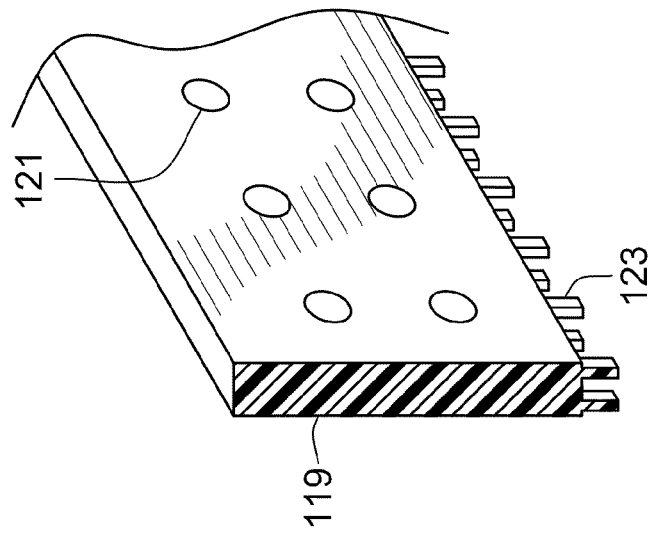
FIG. 6 is a perspective view of part of a strengthening ring usable in the filter element frame/seal of FIG. 5.

In yet another embodiment, the filter element 110 includes an integral, single-durometer urethane foam frame/seal molded over an optional rectangular strengthening ring 119 (shown in phantom) of metal or plastic to provide some additional rigidity, if needed. Typically, the strengthening ring 119 will be perforated such that when the urethane foam is poured into the mold, the urethane will flow through the perforations, thus bonding the strengthening ring 119 to the frame. The urethane material may be allowed to flow around and through the frame to embed it thereon. FIG. 6 is an illustration of a strengthening ring 119 according to an embodiment of the invention. The rectangular strengthening ring 119 includes perforations 121 and standoffs 123. The standoffs 123 on the bottom side of the strengthening ring 119 keep the body of the strengthening ring 119 from resting on the bottom surface of the mold cavity, thus allowing the urethane foam to completely surround the strengthening ring 119.

Figure 7:
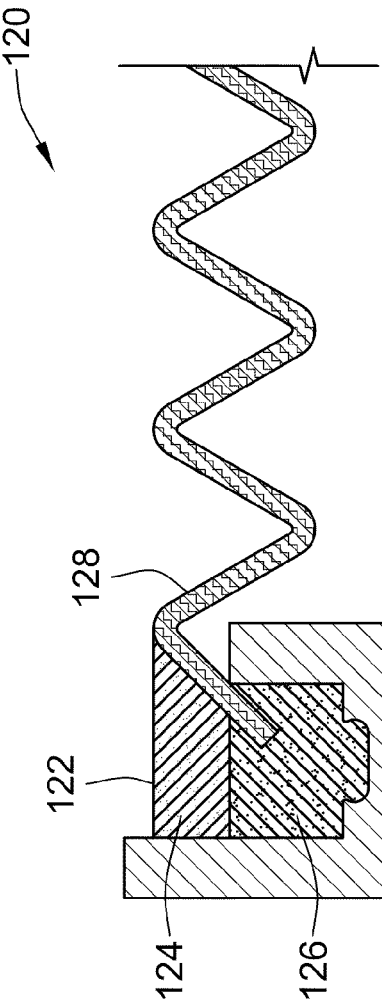
FIG. 7 is a cross-sectional view of a section of a mold for a filter element frame/seal, according to an embodiment of the invention.

An embodiment of the invention illustrated in FIG. 7 shows how a molded urethane frame with seal may be formed in a two-pour process. A filter element 120 includes an integral urethane foam frame/seal 122 with a relatively hard urethane portion 124 that foams or rises less than a relatively softer urethane portion 126 that may foam and expand and which includes the gasket that acts as a seal with the housing 302 (not shown) surrounds an end portion of a composite media 128. FIG. 6 shows a cross-sectional view of the frame/seal 122 and how it can be formed in a mold 130. The mold 130 is a free-rise mold, that is, open-ended, but it is contemplated that a closed mold could also be used to form the frame/seal. The relatively soft urethane material 126 is poured into the bottom of the mold 130, which has the rounded gasket. An end of the composite media 128 is placed inside the mold 130, and the soft urethane material 126 may be allowed to foam up into sealing engagement with the tip end of the filter media to provide a perimeter seal therewith. Then the relatively hard urethane material 124 is poured on top of the relatively soft urethane material 126, preferably prior to full curing of the soft urethane material 126, and around the aforementioned end of the composite media 128 to form the remainder of the frame ensuring a seal between the perimeter filter media and the integral urethane frame/seal 122. The hard urethane material 124 may be poured before the soft urethane material 126 fully sets so that the two integrally bond with each other. The same urethane may also be used for both pours such that one is not formulated to be harder or softer than the other. Plastisol, or other such polymeric materials, may also be used.

Figure 8:
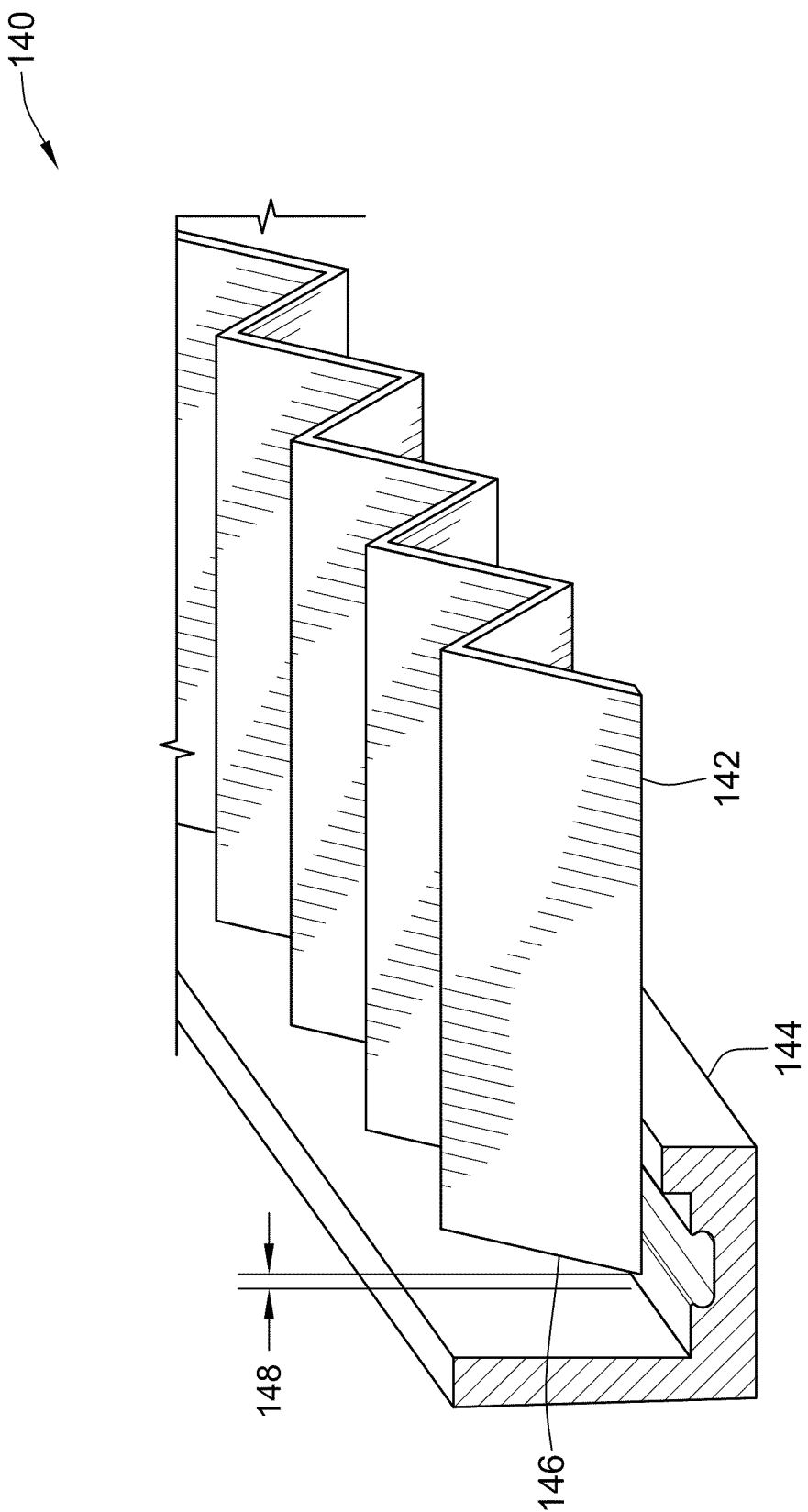
FIG. 8 is a cross-sectional view of another section of a mold for a filter element frame/seal, according to an embodiment of the invention.

FIG. 8 illustrates a filter element 140 that includes a composite filter media 142 and a mold section 144 configured to mold a side 146 of the composite filter media 142 adjacent to the side molded in FIG. 6. The side 146 of composite filter media 142 does not drop down into the free-rise mold 144 as in FIG. 6, but rests on top of the mold ledge. The formation of a frame/seal in mold 144 is a two-step process. A relatively soft urethane foam is poured into the mold 144 and bonds with the tips of the pleats resting on the mold 144. After the urethane sets, a second relatively harder urethane foam is poured in the space 148 between the wall of the mold 144 and the end 146 of the composite filter media 142. In both process steps, the soft and hard urethane materials flow into the gaps between adjacent pleats to provide a perimeter seal along opposing sides.

Figure 9:
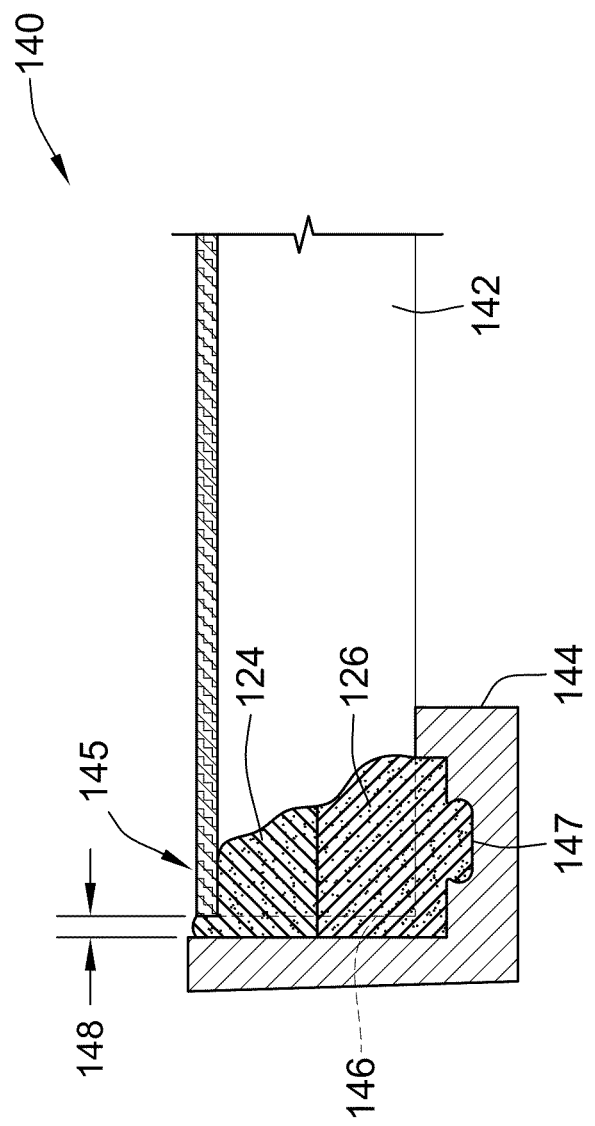
FIG. 9 is a cross-sectional view of the mold and filter element frame/seal of FIG. 8.

FIG. 9 shows a cross-sectional view of the mold 144 and filter element 140 having a polymeric frame/seal 145 and filter media 142. In an embodiment, the integrally formed frame/seal 145, which may be a urethane foam, plastisol, or like material, is a dual-durometer material having a relatively soft portion 126 and a relatively hard portion 124. The soft portion 126, which has a sealing gasket 147 is poured into the mold 144 first. If the material being molded is a urethane foam, as it rises in the mold, the urethane foam tends to be absorbed by the filter media 142. When the urethane foam sets, a bond is formed between the filter media 142 and the frame/seal 145. The hard portion 124 of the urethane foam is injected in the space 148 between the mold 144 and the end 146 of the filter media 142. In this way, the hard portion 124 bonds with the earlier-poured soft portion 126 and envelops a portion of the filter media 142, thus further bonding the filter media 142 to the integrally formed urethane frame/seal 145.

Other Desirable or Preferred Characteristics, Capabilities and Features of Contemplated Embodiments of Filtration Medias Accordingly, various guidelines and parameters have been contemplated for a suitable media, not all of which are necessarily required, but are noted and contemplated as useful in developing a media that can use surface tension and the capillary effect to withstand the effects of a continuous salt fog spray mist exposure while fans are operating with the housing drawing air through the filter media, and thereby prevent moisture breaking through the filter and into the housing. As such, embodiments of the present invention may include one or more of the features and parameters discussed below, preferably the more the better.

One preferred structural feature of certain embodiments is the provision of a separate carrier or substrate layer to provide for the pleatability and support strength functions (and optional additional dust depth loading function if located along the upstream side); in combination with a very high efficiency depth-loading media layer(s) that provide for moisture penetration resistance due to capillary action as well as small dust particle collection via depth loading. The carrier substrate layer may be either on the upstream or downstream side of the high efficiency depth loading media layer(s). For example, as shown in FIG. 10, the composite filter media 102, which is applicable and can be used in any of the embodiments discussed herein, may include a support carrier substrate support layer 502 and one or more deposition efficiency layer(s) 504 of a finer fiber entanglement including melt blown fibers laminated to a surface of the carrier substrate support layer 502. The embodiment of FIG. 10A shows two melt-blown deposition efficiency layers 506, 508 deposited one on top of the other, the bottom layer laminated to a substrate layer 502. Both efficiency layers 506, 508 may either have the same or similar melt-blown fiber composition and characteristics or alternatively different fiber compositions and characteristics to provide for gradient depth-loading or other filtration features.

Figure 11:
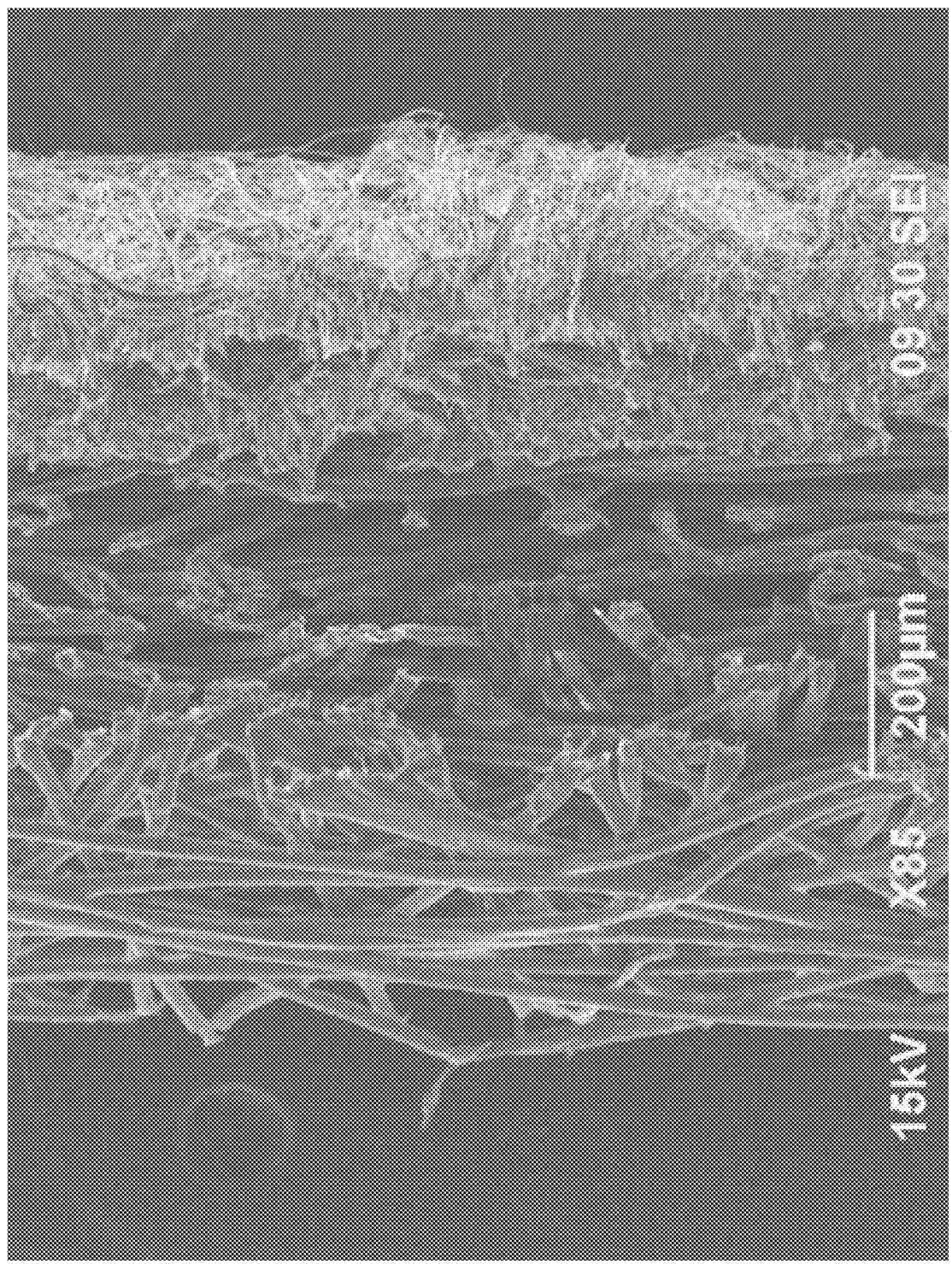
FIG. 11 is a photograph taken at times 85 magnification showing a cross-section of a composite filter media, used for Example 2, that includes a depth-loading media and a substrate or carrier media according to an embodiment of the invention.

In viewing the SEM image of an exemplary filter media shown in FIG. 11, a couple of observations can be made about selections of medias for various embodiments. First, the average fiber thickness of individual fibers is much greater in the carrier substrate support layer than in the one or more deposition layers. For example, the average fiber thickness of individual fibers in the substrate layer may be between 5 micron and 50 micron, and more preferably between 10 and 35 micron. It is also seen that little variability in fiber thickness may be provided in the substrate support layer (less than 2.5 times variation and typically less than one times of fiber thickness variation difference between largest and smallest fibers (excepting out statistical aberrations—measured by 97.5% of the fibers). The substrate or carrier support layer with substantially thicker fibers can therefore provide structural support to withstand air flow forces and support the finer fibers of the efficiency layer(s) against the effects of the same such as when subject to air flow conditions in telecommunications applications under salt fog conditions. This may be due to the fact in part that the fibers of the carrier support layer are on average between 4 and 20 times as thick as those of the efficiency layer(s).

Figure 12:
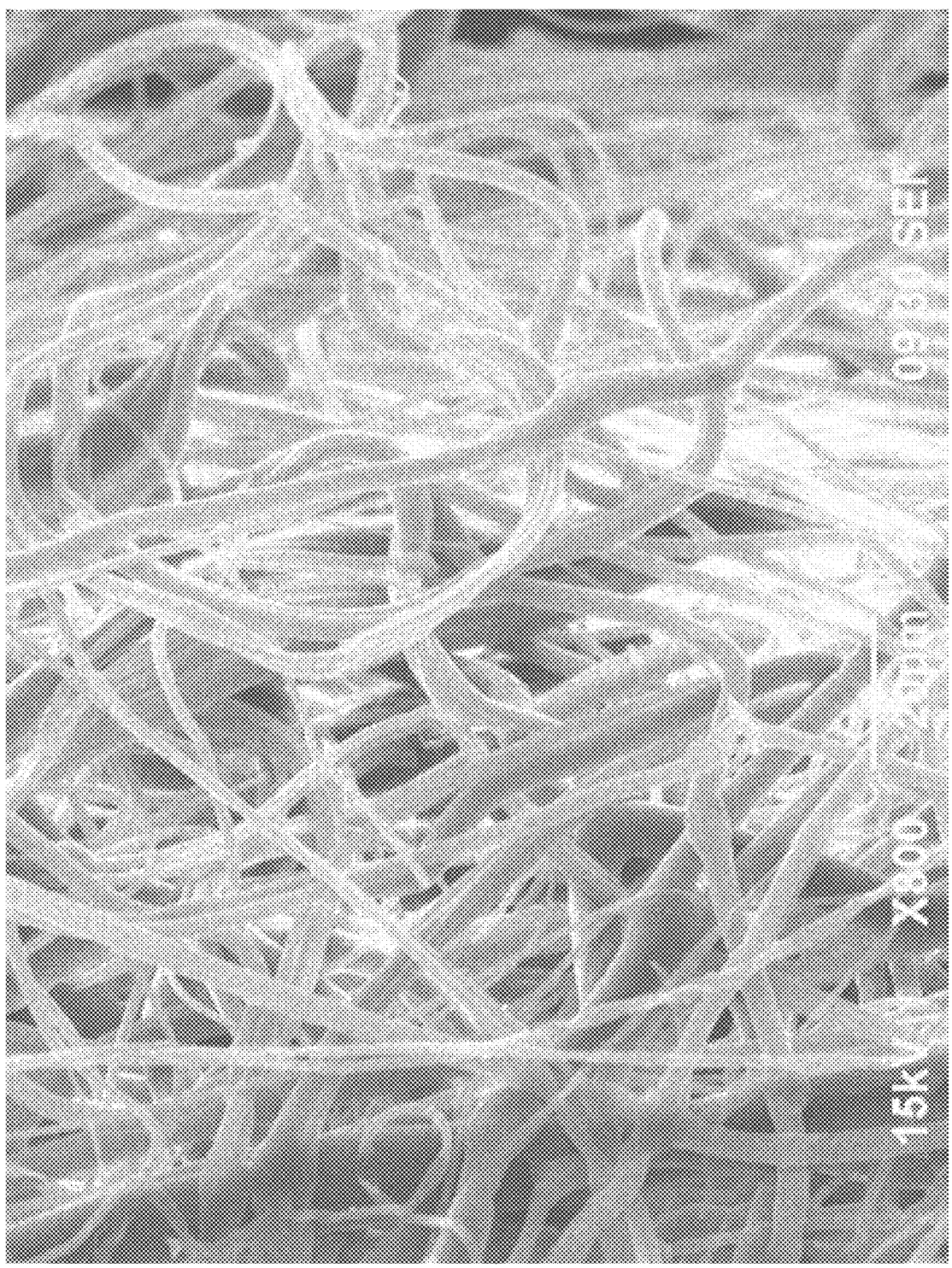
FIG. 12 is a photograph taken at times 800 magnification showing a cross-section of the depth-loading filter media, also used for Example 2, according to an embodiment of the invention.

In contrast, as shown in FIG. 12, the efficiency layer(s) may include a smaller average diameter of between 0.5 micron (500 nanometers) and 5 micron, and a great range of variability in fiber size with some fibers closer to about 5 micron for example and some closer to about 1 micron, and even sub-micron fibers with fibers having thickness measured in nanometers. Thus, the variability in fiber thickness may be at least 300%, greater than 500%, and perhaps up to 1000% (excepting out statistical aberrations—e.g. measured by 97.5% of the fibers). Fiber variation is believed to have an advantage in that smaller fibers or brittle type material fibers could be more subject to deformation, breakage and the like that could change pore size over time. By selecting media with intermingled different sized fibers within the efficiency layer, it is theorized that smaller fibers can provide the benefit of reducing pore size and creating capillary action without unduly creating restriction within the depth of the media; and larger fibers can provide internal support. To maintain fiber strength and prevent deformation or movement of fibers within the fiber entanglement, it may be desirable to heat set, thermally bond, solvent bond and/or adhesively bond the individual fibers together at the contact points between the fibers, and thus are contemplated as embodiments. Additional processing or steps included in a melt blown or fiber entanglement laying process may thus be desired.

In terms of fiber materials, various polymeric materials can be selected, and preferably providing such fibers with an electrostatic charge to enhance capture efficiency may be desirable. Typically non-absorbent fibers will be desired to avoid deformation of fibers. Synthetic fibers including, but not limited to, polypropylene, polyester, nylon, polyethylene, bi-component fibers and the like are contemplated, as well as possibly glass fibers or other synthetic fibers for either the carrier substrate layer and/or the efficiency layer(s).

The materials for the carrier substrate layer preferably may be heat set or otherwise embossable to provide for pleating functionality. For example, U.S. Pat. Nos. 6,885,833, 5,290,447, and 5,804,014, and German patent DE 19755466 A1, show a suitable carrier substrate layer and technology for embossing and pleating, the entire disclosures of which are hereby incorporated by reference. This when combined with the efficiency layer(s) and selecting an efficiency layer that can maintain performance after pleating is preferred so that the efficiency layer(s) can be first deposited upon and laminated to the carrier layer first, and then a subsequent pleating operation can be employed. It is noted for example that some stretching or compression at the pleat tips can occur during pleating in the efficiency layer(s).

As also can be observed in the SEM image at FIG. 11, the substrate support layer, with a substantial open pore structure to provide substantial air permeability by itself. For example, the air permeability in the substrate support layer by itself is typically greater than 318 cfm/square foot; and preferably greater than 300 cfm/square foot, measured by a Frazier air permeabilty test at 0.5" water gauge. The substrate media test sample was one square meter. The restriction or limiting factor on air flow is the depth-loading efficiency layer(s), such that the composite has an overall air permeability of at least 10 cfm per square foot, and preferably between 15 and 40 cfm per square foot, measured by a Frazier air permeabilty test at 0.5" water gauge. The efficiency layer test sample was 100 square centimeters.

As illustrated by the examples below, a great degree of particle capture efficiency is desired for smaller particles. It has been found that filter media with greater than a MERV 14 rating is desired. Preferably, at least a MERV 16 rating, and even better, is desired. Thus, the efficiency layer is quite tight enough to provide for moisture filtration through capillary action and surface tension effects throughout the depth of the efficiency layer(s).

In terms of pore related pressure characteristics, some desirable characteristics have been contemplated. Preferably, the media has a mean flow pore pressure greater than 0.6 psi and a mean flow pore diameter less than 10 microns; and even more preferably, a mean flow pore pressure greater than 0.8 psi and a mean flow pore diameter less than 8 micron. A bubble point pressure of greater than 0.3 psi is also desirable.

As illustrated by some of the data shown in FIGS. 8 and 9 and by the examples discussed below, some desirable efficiency and pore size characteristics are contemplated. For example, an efficiency of the composite filter media is greater than about 90 percent for particles from 0.30 to 0.40 microns in diameter. Further, a very tight pore size distribution is provided for air flow. For example, the pore size distribution of the composite filter media (which is controlled by the efficiency layer(s) is such that preferably more than 50 percent of the pores are from 4 to 8 microns in diameter; preferably a pore size average diameter of between 5 micron and 7 micron; and preferably less than 20 percent of the pores are larger than 10.5 microns in diameter. Yet according to a further measurement, a cumulative filter flow of 90 percent through the composite filter may be achieved at an average pore diameter between 4 and 6 microns to provide for sufficient air flow, yet less than 20 percent of cumulative filter flow through pores having a diameter of greater than 20 microns. Further, preferably, the smallest pore size in the composite filter media is less than four microns in diameter, greater than 5% of the pore sizes being less than 5 micron.

The melt blown polymeric fiber entanglement (e.g. the two efficiency layers 506, 508 combined) preferably has a thickness of at least about 0.25 millimeter and typically less than about 1 millimeter and preferably between 0.3 millimeter and 0.5 millimeter; and the composite filter media (substrate and efficiency layers combined) include a thickness of at least about 1 millimeter, and preferably a thickness of between 1 and 3 millimeters. The media may have an air permeability (cfm @0.5" $H_2O$) of between 15 and 40; a basis weight of between 100 and 200 grams/$m^2$. When the efficiency layers are upstream, there is at least 0.25 millimeters of depth filtration available particularly for the smaller particles as suggested by the efficiency graph of FIG. 13 (suggesting perhaps that smaller dust under 1 micron tend to depth load, whereas debris or larger particles may tend to load on and into the surface of the media). Such depth also can be seen with reference to FIG. 11, which is a cross-section through the composite media to show the various layers.

This provides a substantial dust holding capacity of with an average synthetic dust weight arrestance greater than 96 percent, and wherein an ASHRAE dust holding capacity of the composite filter is greater than 0.75 grams per square foot. A further increase and gradient depth filtration can be achieved by reversing the media wherein larger dust particles would tend to load into the substrate carrier layer (which is upstream) and

EXAMPLES

Example 1

A MERV 14 rated filter was Salt Fog tested. The filter media, made by Kimberly-Clark had the following characteristics: KC984L is a gradient density, bi-component, three-layer media made of polypropylene. The basis weight of KC984L is from 3.25 to 3.40 ounces per square yard; the air permeability is from 59 to 87 cfm per square foot. The target efficiency is 80%, while the minimum roll average efficiency is 69% determined using TSI Model 8130 automated filter tester with 0.3 micron salt particles at 85 liters per minute. The target MD Gurley stiffness is 340 mg, while the minimum roll average stiffness is 280 mg.

After subjecting the MERV 14 media to two days of intensified Salt Fog testing (the shortened 5 day test), moisture broke through the filter media, and thus it did not pass that Salt Fog test. SEM images suggest that the fibers of the filter media had been stretched and/or deformed in some respect or broken. The spaces between the fibers seemed to have been widened especially in the center of the media. As a result of the failure, it was theorized that a more dense, tighter fiber entanglement media would have a better chance of succeeding intensive salt fog testing. As such, further investigation and development was conducted.

Example 2

A tighter efficiency layer was then sought and selected to be laminated to an upstream surface selected substrate. The selected substrate was made by Kimberly-Clark, under the trade designation Intrepid 684L HVAC Filtration Media, with the following reported properties and characteristics:

Polypropylene/Polyethylene
Basis weight: 3.10-3.40 oz./sq. yd.
Frazier air permeability: 318 cfm/$ft.^2$ (min. 303 cfm/$ft.^2$ roll avg.)
Target Efficiency: 48% (min. 42% roll avg.)—determined using TSI Model 8130 using 0.1 micron count median diameter NaCl particles at 85 lpm.
MD Gurley Stiffness: 325 mg (min. 265 mg roll avg.)

A tighter meltblown polypropylene material with two layers was made and laminated to what would become the upstream surface substrate by Transweb, LLC, located in Vineland, N.J. SEM images of the media are shown in FIGS. 6 and 7. The composite filter media was made by Transweb, LLC, was designated by Transweb LLC with the trade designation T-Lam Grade AIRG-002 (Meltblown Polypropylene laminated to a high loft substrate) whose physical and filtration specifications are reported in the table below.

TABLE I

| T-LAM AIRG-002 Physical and Filtration Specifications | | |
|---|---|---|
| PARAMETER | UNITS | OBJ |
| Basis Weight | gms/m2 | 160.0 |
| Thickness | millimeters | 1.35 |
| Air Permeability | cfm @ 0.5" H2O | 25.0 |
| Resistance 5 cm/sec DOP | mm/$H_2O$ | 6.5 |
| Penetration 5 cm/sec DOP | percent | .015 |

Filtration testing performed on the TSI-8130
100 $cm^2$ Sample Holder (non pleated; flat sheet testing)
Challenge Aerosol DOP (Dispersed Oil Particulate at mean particle size of 0.3 micron)
Face Velocity 5 cm/sec The filter media was prepared into a 24"×24"×4" pleated and embossed panel configuration with a rectangular frame with the upstream surface being the two layers of tighter polypropylene melt blown fibers. The media was also analyzed for filtration parameters indicative of potential capillary action. Testing shown that this media would qualify as at least a MERV 16 rating. The new media had a smallest detected pore diameter that was more than one micron smaller with a pore pressure that was more than 0.6 psi higher than the MERV 14 media of example 1. The most notable difference in the capillary flow test can be seen in that the mean flow pore pressure of Example 2 was almost double the MERV 14 media of example 1; and the mean flow pore diameter was about 5 microns smaller than the MERV 14 media of example 1.

A capillary flow test was conducted on a test sample of the composite filter media of Example 2. The bubble test pressure, used to determine the largest pore size in the test media, was 0.327 psi, which translates in to a maximum pore size of 20.2061 microns. The mean flow pore pressure was 0.978 psi, which translates into a mean flow pore diameter of 6.7461 microns. The smallest pore detected was 3.0048 microns and the pressure at the smallest pore was 2.196 psi.

Figure 13:
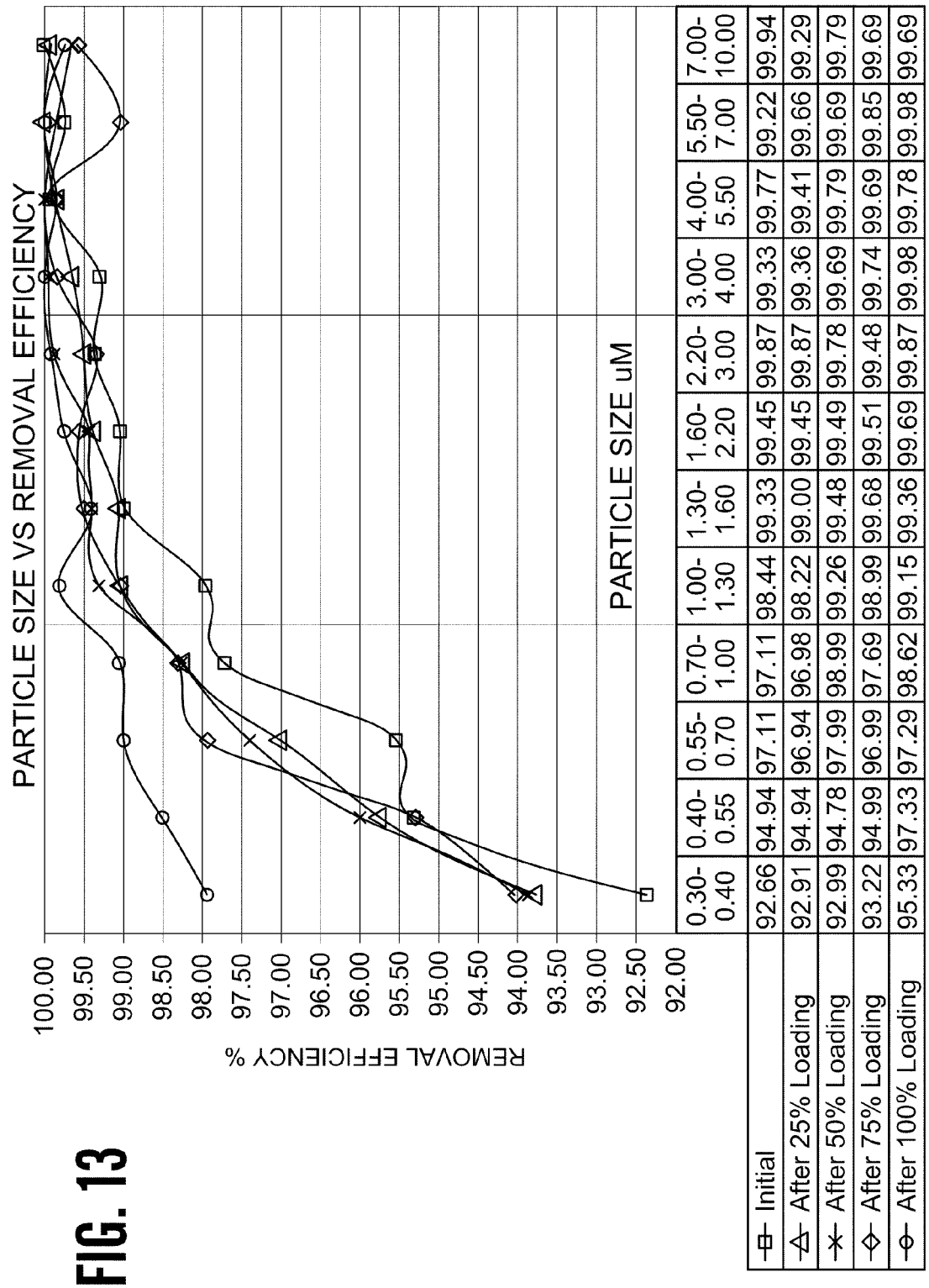
FIG. 13 is a graphical illustration showing removal efficiency versus particle size at various stages of dust loading for a composite filter media according to an embodiment of the invention.

A 24"×24"×4" filter test sample was tested in an air flow having a 246 foot per minute face velocity. The efficiency of the composite filter media of Example 2 at various stages of dust loading is shown in FIG. 13, which is a graph of particle size versus removal efficiency after incremental dust loading. The graph includes five curves showing the removal efficiency for particles of various sizes ranging from 0.30-0.40 microns to 7.00-10.00 microns. The five curves show the initial efficiency of the composite filter media, after 25% loading, after 50% loading, after 75% loading, and after 100% loading. It can be seen that for small particles, the composite filter media is least efficient initially and most efficient at 100% loading. This is to be expected because at 100% loading the dust particles in the composite filter media clog some of the pores making it more difficult for other dust particles to pass through the filter media. However, this loading of the filter, while increasing efficiency also has the undesirable quality of reducing permeability so that the amount of air that can pass through the filter media in a given time is significantly reduced.

Figure 14:
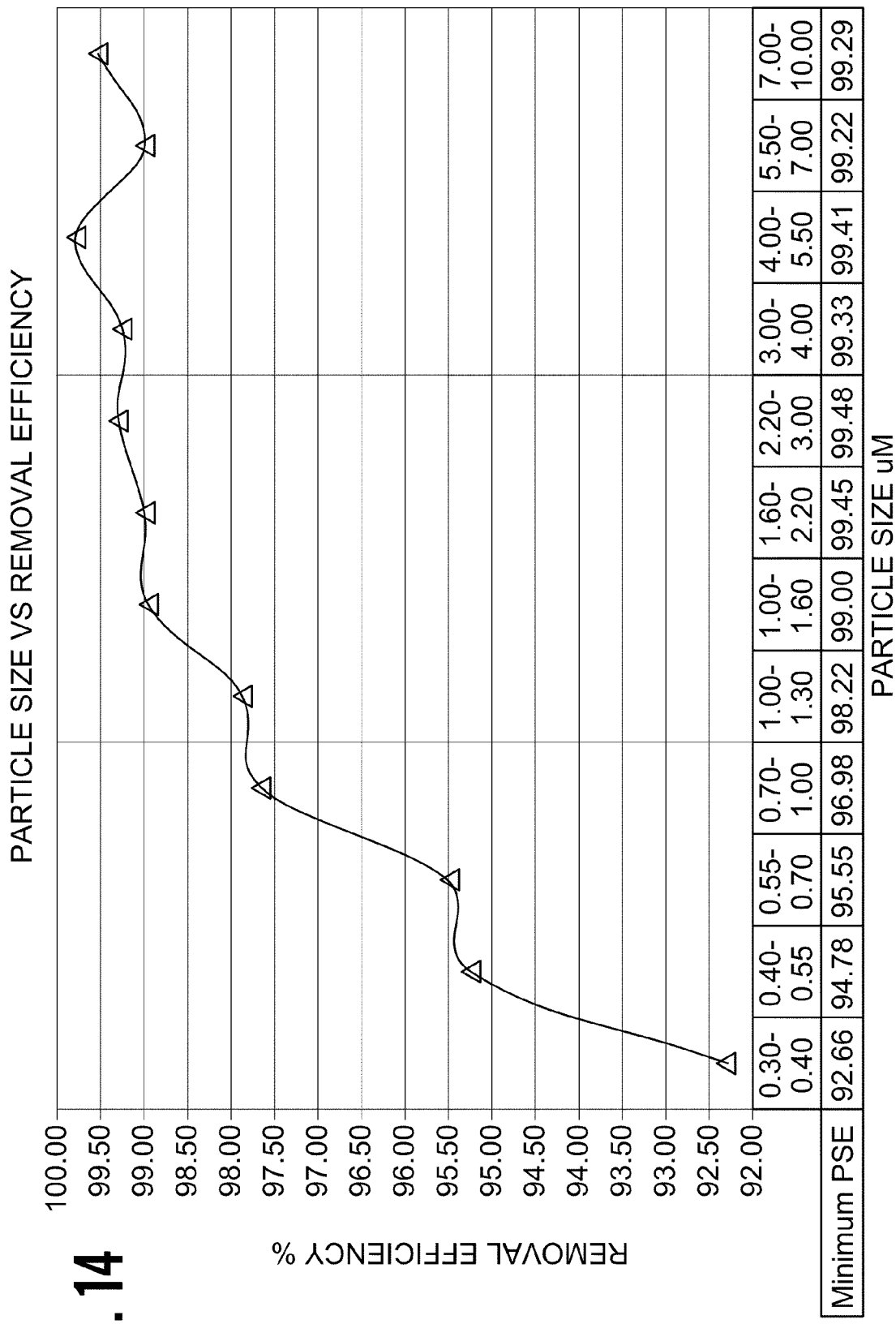
FIG. 14 is a graphical illustration showing a composite minimum efficiency curve based on the multiple curves shown in the graph of FIG. 13.

FIG. 14 shows a composite minimum efficiency curve which combines the five curves from FIG. 13 and shows, at each particle size, the removal efficiency of the least efficient of the five curves. It can be seen from the minimum efficiency curve that the composite filter media has an efficiency greater than 91% for particles from 0.30-0.40 microns in diameter, an efficiency of greater than 94% for particles from 0.55-0.70 microns in diameter, an efficiency of greater than 97% for particles from 1.00-1.30 microns in diameter, and an efficiency of greater than 98% for particles from 1.30 to 1.60 microns in diameter. The test sample exhibited composite average efficiencies of 95.02% for particles from 0.30-1.00 microns in diameter, 99.04% for particles from 1.00-3.00 microns in diameter, and 99.31% for particles from 3.00-10.00 microns in diameter. The same test sample had an initial resistance of 0.47 in water gauge and a final resistance of 1.00 in water gauge. The composite filter media recorded a weight gain of 50.40 grams after dust-load testing. The media area of the composite filter media for the test sample was 61.03 square feet, making the ASHRAE dust-holding capacity of the composite filter media in the test sample 0.826 grams per square foot.

A second 24"×24"×4" filter element test sample subjected to ASHRAE Standard 52.2 testing yielded similar efficiency statistics. The second test sample, tested in a 246 foot per minute air flow, exhibited composite average efficiencies of 95.19% for particles from 0.30-1.00 microns in diameter, 98.78% for particles from 1.00-3.00 microns in diameter, and 99.40% for particles from 3.00-10.00 microns in diameter. The second test sample had an initial resistance of 0.46 in water gauge and a final resistance of 1.00 in water gauge. The composite filter media recorded a weight gain of 48.90 grams after dust-load testing. The media area of the composite filter media for this test sample was also 61.03 square feet, making the ASHRAE dust-holding capacity of the composite filter media for the second test sample 0.801 grams per square foot. Based on the results of the ASHRAE testing under Standard 52.2, the composite filter media met the requirements of a MERV 16 filter media.

Figure 15:
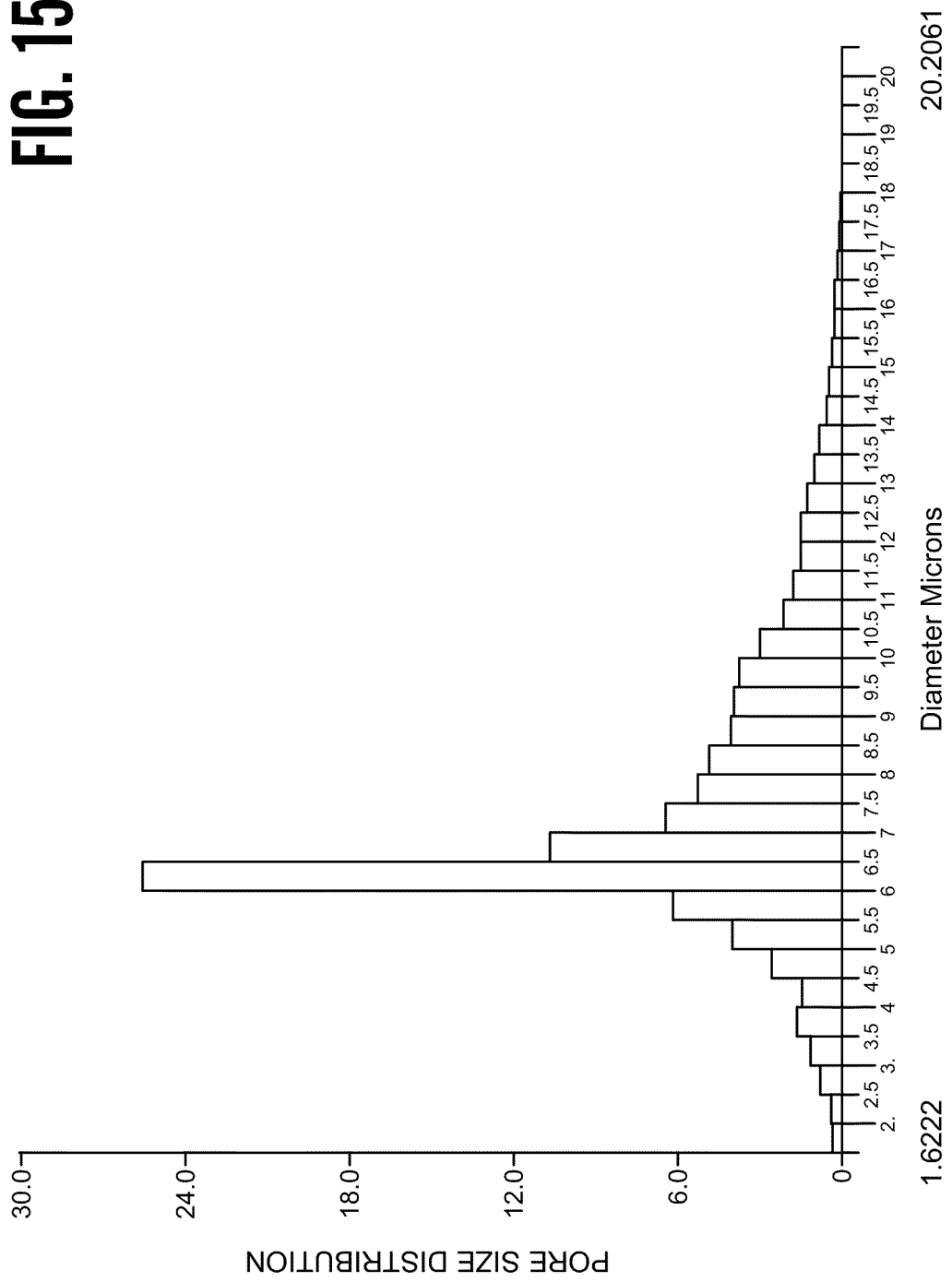
FIG. 15 is a graphical illustration showing the pore size distribution of a composite filter media according to an embodiment of the invention.

FIG. 15 is a graphical illustration showing the pore size distribution for the composite filter media of Example 2. The graph shows that the combination of the substrate layer and the high-efficiency depth-loading media layer have a pore size distribution wherein at least 50% of the pores have an average diameter from 5 to 8 microns. Pore size distribution over a separation range of 6 micron; at least 40% (and more preferably at least 25%) of pore size distribution over a separation range of 4 micron; and/or at least 25% of pore size distribution over a separation range of 2 micron.

Figure 16:
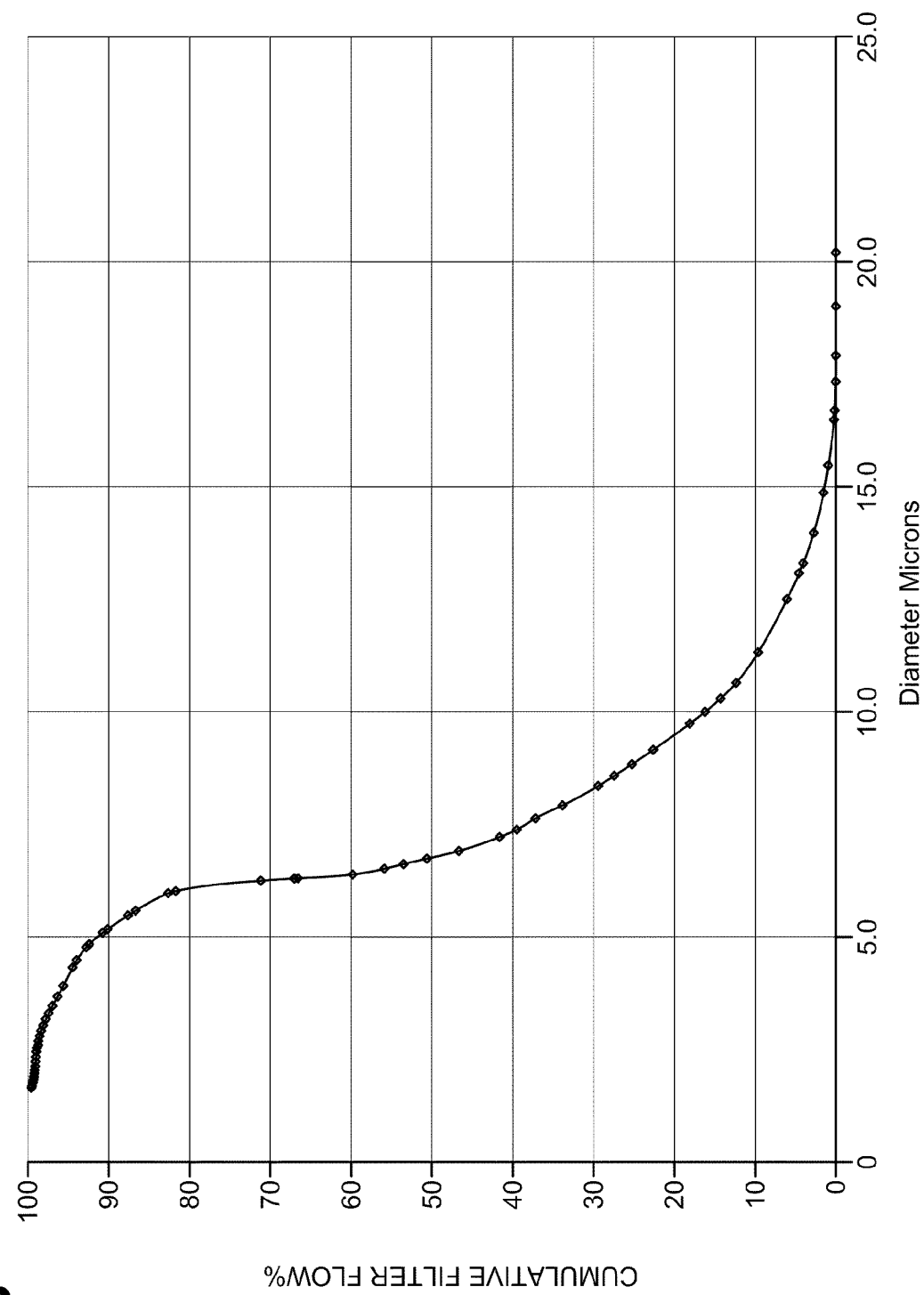
FIG. 16 is a graphical illustration of the cumulative filter flow percentage versus average pore diameter for a composite filter media according to an embodiment of the invention; and While the invention will be described in connection with certain preferred embodiments, there is no intent to limit it to those embodiments. On the contrary, the intent is to cover all alternatives, modifications and equivalents as included within the spirit and scope of the invention as defined by the appended claims.

FIG. 16 is a graphical illustration of the cumulative filter flow percentage versus the average pore diameter. The curve 1102 shows that there is 10% cumulative filter flow at an average pore diameter of approximately 11.3 microns, a 25% cumulative filter flow at an average pore diameter of approximately 8.9 microns, a 75% cumulative filter flow at an average pore diameter of approximately 6.1 microns, and a 90% cumulative filter flow at an average pore diameter of approximately 5.2 microns.

The filter media was constructed into a rectangular panel filter frame and then Salt Fog tested. The filter passed the standard 30-day salt fog test and an intensified five day salt fog test.

Comparative Analysis of Example 2 with Membrane Media

Testing to date has suggested that the composite media of Example 2 has substantially increased air flow and dust loading benefits as compared with a Gore® brand "COOLING FILTER" sold by and commercially available from W.L. Gore & Associates GMBH. Tests and analysis was based on data interpretation (for different sizes of filters and/or reported data). This analysis showed that the composite media of Example 2 is experiencing about ⅓ of the resistance of the Gore® brand "COOLING FILTER". It has been shown therefore that the Additionally, dust loading capacity appears to be at least 30% higher than the Gore® brand "COOLING FILTER". It was theorized that reversing the media to have the substrate on the upstream surface would provide an even greater difference in dust holding capacity.

Example 3

The same composite media as discussed in Example 2 was reversed, with the substrate carrier media located upstream of the two layers of tighter polypropylene melt blown fibers. A filter made with this sample was subjected to a water fill test as described below. The filter passed the water fill test without water passing through over the designated time. Based on this, subsequent testing was performed including the 30-day salt fog test and the intensified five day salt fog test. Like example 2, in example 3, the filter media was constructed into a rectangular panel filter frame and then Salt Fog tested. The filter passed the standard 30-day salt fog test and an intensified five day salt fog test.

Testing Methodologies

For the examples and discussion above some attention will be given to test methodologies that can be useful for evaluating depth-loading media and substrate media parameters. Efficiencies as set forth herein that can be measured using fractional efficiency test methodology generally according to standard ASHRAE 52.2 and more particularly to the methodology and equipment explained below. Efficiency tests were conducted using S3I particle counters placed upstream and downstream of the filter media test sample, and AFTL dust feeders, wherein the feeding rate was 2.00 grams per 1000 cubic feet. The air flow capacity of test equipment was 984 cubic feet per minute and face velocity was 246 feet per minute, based on 4 square foot test duct and a 24"×24"×4" filter media test sample.

For the testing results set forth herein, an ASHRAE 52.2 methodology was utilized employing an ASHRAE 52.2 Test Dust and "ISO Fine" test powder, which is available from Powder Technology, Inc. of Burnsville, Minn. (Part No. ISO1212103-1). The test samples consisted of filter elements in which an aluminum frame supported composite filter media 24 inches wide by 24 inches high by 4 inches deep. The composite filter media had 50 pleats such that the media area was 61.03 square feet. The composite media was bonded to the aluminum frame with a urethane sealant. The test samples were subjected to the ASHRAE 52.2 Test Dust per ASHRAE 52.2 methodology Filtration testing was performed on a TSI-8130 using a filter test media sample of 100 square centimeters. Penetration and resistance testing was performed using a challenge aerosol per ASHRAE 52.2 STD at a concentration of 15% suspended in distilled water and aerosolized per the standard and applied with a face velocity of 5 centimeters per second.

Pore size distribution data can be measured using a pore size distribution test according to standard ASTM-F316. A maximum pore size is determined using the bubble point test. A filter media test sample is wetted on one side and subjected to pressurized air on the other side. The air pressure is gradually increased until a stream of bubbles appears on the wetted side. The pressure at which the stream of bubbles appear can be used to calculate the maximum pore size. For tests conducted herein, pore size distribution was conducted by the following methodology and equipment: a PMI (Porous Materials, Inc. of Ithaca, N.Y.) brand Automated Capillary Flow Porometer—model no. CFP-1100AX-U-08182005-1446. The Porometer first generates test data for a dry test sample filter media, then instructs the operator to saturate the filter media, and generates capillary flow test data for the test sample filter media. The wetting fluid used to saturate the test sample was a Galwick fluid with a surface tension of 15.9 dynes per centimeter.

Pore size diameter is calculated using the following formula:

$$Dia.=(0.415 \times Surface\ Tension) \div Pressure$$

$$Pore\ size\ distribution = (FFP - Last\ FFP) \div (Last\ Dia. - Dia.)$$

where Filter Flow % FFP=CFF−Last FFP and Cumulative Filter Flow % CFF=(Wet Flow÷Dry Flow)×100

Max. pore dia.=(C×T)÷P where C is a constant, T is surface tension, and P is differential pressure. The pressure at which wet flow is one-half the dry flow is used to calculate the mean flow pore size using the above equation for maximum pore diameter.

Rigorous test methodologies for the telecommunications industry for electronics housings (e.g. such as cabinets or casings) are discussed below (often in the context of sealed heat exchanger systems; but the same tests are applied to vented air filtered systems). A company that performs such tests is Environ Labs, 9725 Girard Avenue South • Minneapolis, Minn. 55431, 952-888-7795 • FAX 952-888-6345 • 800-826-3710 (www.environlab.com). Typically, the most important test as far as the filter element is concerned is the "salt fog test" in which the housing including the filter element is subjected to salt fog mist with the fans running within the housing to draw air through the filter element. A filter element passes the test by preventing the moisture from breaking through after 30 days of testing. The tests include the following Telecordia specifications:

Wind-Driven Rain Intrusion CR3-192—this test requires that the cabinet prevent water intrusion after exposure to a simulated wind driven rain test. This test shall be performed in accordance with MIL-STD-810E, Method 506.3, Procedure 1, using the following test parameters: • All fans shall be in operation and any dampers shall be open • Rainfall Rate—15 cm/hr (5.8 in/hr) • Wind Velocity—31 m/sec (70 mph) • Cabinet volume shall be based on overall outside dimensions. The simulated wind shall be directed horizontally to blow through the water spray and drive it against the surfaces of the cabinet. The cabinet shall be rotated so that each surface is exposed for 30 minutes. The doors shall then be opened, one at a time, and the interior shall be examined.

Rain Intrusion No Wind R3-193—this test ensures that cabinets shall be protected against water intrusion during heavy rain storms (e.g. to ensure water is drained and not channeled into cabinet).

Lawn Sprinkler O3-194—this test ensures that water intrusion is prevented after exposure to a simulated lawn sprinkler test.

Weathertightness & Dust Intrusion R3-195—this test ensures that dust intrusion is prevented.

Wind Resistance R3-198—this test ensures that pad mounted cabinets are capable of resisting the overturning moment resulting from a wind gust of 67 msec (150 mph) perpendicular to the largest vertical surface area.

Impact Resistance R3-199—this test ensures the cabinet can withstand subjection to the required impact loads.

Fire Resistance R3-202—which ensures that cabinets shall maintain internal temperatures that preclude ignition of equipment inside when subjected to the simulated brush fire test.

Corrosion Resistance—Salt Fog R3-203—This test ensures that the filter and cabinet can withstand prolonged exposure to salt fog without water penetrating through the filter According to this test, the entire cabinet is placed in an environmental test chamber and exposed to a salt fog spray for 30 days, consistent with GR-487-CORE and in accordance with ASTM B 117. Fans, used to circulate outside air (i.e., heat exchanger fans), shall be in operation during this exposure.

Additional tests beyond the Telcordia tests have been developed. For example, while the above Salt Fog test is the industry standard, there is the possibility of doing alternatives for evaluation. A shortened salt-fog or Corrosion Resistance Test was performed in accordance with IEC 68-2-52, Second Edition, Test Kb, Severity 3. The test procedure consisted of four cycles of two hours in a salt fog followed by 22 hours of high humidity, which was then followed by a three day drying period after which the frame was inspected. The fans were also operational during the three-day drying period of the test.

Additionally, internally has been developed a test that is suggestive of whether a filter media may pass the salt fog test, namely, the water fill test. This test verifies that the composite media is resistant to the passage of water through the media and thus would be promising or likely to pass the salt fog test. The filter element is supported horizontally and water is poured onto the filter element until the side facing up is saturated. After 36 hours, the surface underneath the filter element is checked to determine if any water leaked through the filter media. If no water leaks through the test sample, it is promising that it would pass the Salt Fog test.

Additionally, numerous different types of dust loading tests can be performed as well as numerous filtration tests.

Alternative Contemplated Filter Media Embodiments

It should be appreciated that surface filtration means may also be utilized in alternative embodiments. In another embodiment of the invention, a filter element 210 illustrated in FIG. 2A is similar to the filter element of FIG. 2. However, in this embodiment, mesh, woven material, screens or scrims 212 may be combined with the pleated composite filter media 202. The scrim 212 serves to protect the composite filter media 202 by screening out relatively large objects, such as leaves, paper, and the like that might damage or interfere with the operation of the composite filter media 202.

In the embodiment shown in FIG. 2A, the scrim 212 is pleated in the same manner as the composite filter media 202 so that the scrim 212 can be meshed with the composite filter media 202 during assembly. Such mesh, woven material, screens or scrims 212 may act as a pre-filter for larger dust particles for example. The scrim, whether pleated or flat also adds structural rigidity to the composite filter media 202 allowing the use of the filter media 202 in high-flow-rate environments without a loss of filter media integrity. The scrim 212 can be secured to the frame 208 filter element 210 by the adhesive 211 in same manner that the filter media 202 is secured to the frame 208.

Figure 2B:
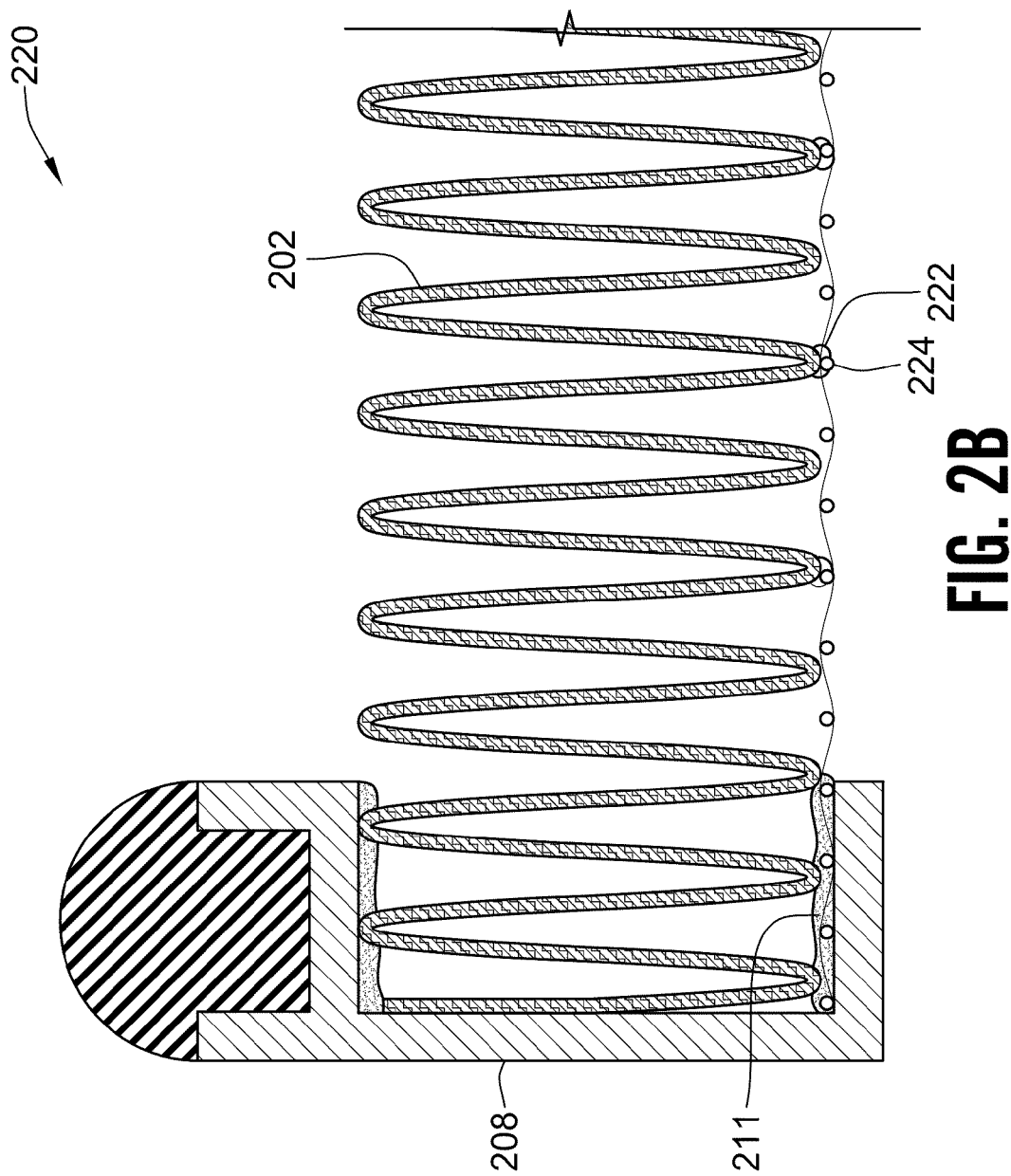
FIG. 2B is a cross-section of the filter element according to an alternative embodiment similar to FIG. 2, but where the filter element includes an additional flat scrim material or alternatively metal or plastic mesh bonded across the pleat tips on the upstream side to additional provide a surface filtration pre-filter.

In an alternate embodiment of the invention illustrated in FIG. 2B, a filter element 220 includes filter media 202. In an embodiment of the invention, the scrim 222 is a flat, woven mesh of metal, plastic, or other suitable material that extends across the peaks 224 of the pleated composite filter media 202. The scrim 222 may be attached to the peaks 224 of the filter media 202, or it may be attached to the frame 208 via the adhesive 211. Such a flat scrim 222 can also add structural rigidity to the filter media 202.

Other types of medias are contemplated as well which can provide for pore structures that prevent salt fog mist penetration due to capillary action and/or surface tension including the use of nanofibers (fine fibers formed from electrospinning with average diameter (e.g. thickness) less than one micron and typically less than 500 nanometers, and in some embodiments less than 100 nanometers) either on the surface of a substrate layer or integrated into a media layer. For example, it is contemplated that one way to improve the efficiency, reduce pore size (without necessarily increasing restriction) and capabilities of filter media includes the use of extremely fine fibers, or nanofibers, such as disclosed in application Ser. No. 12/271,322, entitled Filtration medias, Fine Fibers Under 100 nanometers and methods; application Ser. No. 12/428, 232, entitled Integrated Nanofiber media; application Ser. No. 12/357,499 entitled Filter Having Meltblown and Electrospun fibers, the entire disclosures of which are hereby incorporated by reference. Such embodiments and broader claimed aspects relate to contemplated use of such nanofibers to provide for tiny pores for mist filtration. These fine fibers may be made from a variety of different polymers.

While the tightness of the media is one aspect and the use nanofibers can certainly provide a selected pore size parameter range discussed herein, it is contemplated that mere addition of fine fibers such as nano-fibers (or other such tight fiber structure to provide for small pores) would preferably be further supplemented with a suitable electrostatic charge treatment, such as employed on certain examples discussed herein. The selection of a media with such an electro-static charge treatment is believed to be a contributing factor to the prevention of water ingress. This is also known as Such an electrostatic charge treatment should increase surface tension to better prevent water or salt fog ingress. Examples of an electrostatic charge treatment include corona exposure, ion bombardment, and flourine containing plasma, and are sometimes referred to as an "electret" type filter media. Electret is a dielectric material that has a quasi-permanent electrical charge or dipole polarization (equivalent of a permanent magnet). Electret generates internal and external electrical fields and thereby interacts with potential contaminants—in this case water, which is also a bipolar material. As such, it is theorized that the electrical effects are such as to prevent ingress of water through small pores of an electret filter material, if the pore structure is sufficiently tight. Accordingly, when fine fibers such as nanofibers or other such fibers (e.g. fine melt blown) are utilized, preferably an electrostatic charge treatment is employed to generate additionally an electret material. While some electrostatic charge treatments such as corona discharge may be useful, preferably a more permanent treatment may be employed, such as for example the use of flourine-containing plasma as disclosed in U.S. Pat. No. 6,419,871 to Ogale, entitled "Plasma Treatment Of Filter Media", the entire disclosure of the which is hereby incorporated by reference in its entirety, including other referenced patents and the like therein which are also incorporated by reference in their entireties to the extent not inconsistent with the present disclosure.

Filter Medias Generally & Characteristics

Fluid streams such as liquid flows and gaseous flows (e.g. air flows) often carry particulates that are often undesirable contaminants entrained in the fluid stream. Filters are commonly employed to remove some or all of the particulates from the fluid stream. For example, air filtration systems are used to filter gaseous streams for a wide variety of applications. Examples of such systems include: combustion engine air intake systems; vehicle cab air intake systems; HVAC (heating, ventilation and air-conditioning) systems; clean room ventilation systems; various industrial applications using filter bags, barrier fabrics, woven materials; power generation systems; gas turbines systems; and combustion furnace systems to name a few of the more common air filtration applications. Similarly, liquid filtration also involves a wide variety of applications to include filtration of: water, fuel, coolant, oil, and hydraulic fluid to name a few of the more common liquids that are filtered.

One common parameter characteristic of filter media is the "efficiency" of the filter media. Efficiency is the propensity of the media to trap particulates as opposed to allowing the particulates to not be filtered and instead pass through the media. Another common characteristic is pressure drop across the media, which often has traditionally related to the porosity of the media. The pressure drop relates to how restrictive the filter media is to fluid flow. Larger pore sizes typically have allowed for greater fluid flow, but also unfortunately typically result in more particulates being passed. As a result, often efficiency is at odds with pressure drop. In particular, while it is often desirable to trap a large amount of particulates, providing such a high efficiency often has had the undesirable effect of increasing the restrictiveness of the media and therefore the pressure drop across the media.

Efficiency often refers to the initial efficiency, that is the efficiency of the filter media post manufacture but prior to usage and being loaded with particulates. During use, filter media traps and thereby picks up and traps particulates as a typically as a dust cake layer on the surface of, or within, the media. These filtered-out particulates plug the larger holes in the media thereby preventing holes for smaller particles to pass and thereby increases the efficiency of the media over time to an operating efficiency greater than the initial efficiency. However, by plugging fluid flow paths, such filtered out particulates also eliminate or partially clog a fluid passageway and thereby increase the pressure drop across the media making it more restrictive to fluid flow.

Usually, filter lifespan is determined by the pressure drop across the filter. As more and more particles are filtered out of the fluid flow and trapped by the filter media, the filter media becomes more restrictive to fluid flow. As a result, the pressure drop across the filter media becomes higher. Eventually, the media becomes too restrictive, resulting in insufficient amount of fluid flow for the needs of the given application. Filter change intervals are calculated to coincide approximately with such an event (e.g. prior to reaching an insufficient fluid flow situation). Filter change intervals may also be determined through sensors that measure pressure drop load across the media.

One useful parameter for filter media that is often used in the filter industry is the reported MERV (Minimum Efficiency Reporting Value) characteristic according to ASHRAE Standard 52.2. This includes a measure of efficiency relative to pressure drop resistance. A higher MERV number generally identifies a higher grade of filter media, which typically is more expensive. For example, the following table sets forth the MERV reporting value requirements.

media is often pleated, fluted or otherwise constructed in a similarly bunched up manner to increase the amount of filter media surface area available within the frame supporting the filter media. Accordingly, the filter medias of the present invention are typically pleated, fluted, or otherwise bunched up in a suitable filter element construction manner to increase filtration capacity.

While use of filter medias in pleated form may increase filter lifetime for both surface-loading and depth-loading medias, there are some limitations associated with surface-loading medias. One such limitation is the lower burst strength typically associated with surface-loading filter medias. For this reason, surface-loading medias have primarily found use in applications involving relatively low flow stream velocities through the filter media; often not higher than about 30 feet per minute, and more typically, about 10 or 20 feet per minute or even less. For example, there are some low-flow applications with flow velocities of around one foot per minute. The term "velocity" as used herein refers to the average velocity through the media (i.e. flow volume per media area).

Filter medias can be characterized as surface loading media (a.k.a. barrier filtration), and depth media, but that characterization in part depends upon the dust particle size. For example, depth loading media can surface load large debris and/or larger particles for example. However, surface loading media generally traps particles only on the surface of the media in a very thin layer in what is sometimes referred to as a filter cake. Often the filter cake layer forms as a thin skin over the filter media, which can be peeled away usually with relatively light mechanical force. In some applications such as reverse pulse applications, the filter cake is automatically blasted off the filter media surface via a reverse pulse blast of air (or other application of mechanical force) and collected in a waste receptacle. Often times, the filter is simply replaced after sufficient filter cake buildup. Depth media on the other hand works through the thickness of the media to trap par-

TABLE 2

Minimum Efficiency Reporting Value (MERV) Parameters

| Standard 52.2 Minimum Efficiency Reporting Value (MERV) | Composite Average Particle Size Efficiency, % in Size Range, μm | | | Average Arrestance, %, by Standard 52.1 Method | Minimum Final Resistance | |
|---|---|---|---|---|---|---|
| | Range 1 0.30-1.0 | Range 2 1.0-3.0 | Range 3 3.0-10.0 | | Pa | in. of water |
| 1 | n/a | n/a | $E_3 < 20$ | $A_{avg} < 65$ | 75 | 0.3 |
| 2 | n/a | n/a | $E_3 < 20$ | $65 \leq A_{avg} < 70$ | 75 | 0.3 |
| 3 | n/a | n/a | $E_3 < 20$ | $70 \leq A_{avg} < 75$ | 75 | 0.3 |
| 4 | n/a | n/a | $E_3 < 20$ | $75 \leq A_{avg}$ | 75 | 0.3 |
| 5 | n/a | n/a | $20 \leq E_3 < 35$ | n/a | 150 | 0.6 |
| 6 | n/a | n/a | $35 \leq E_3 < 50$ | n/a | 150 | 0.6 |
| 7 | n/a | n/a | $50 \leq E_3 < 70$ | n/a | 150 | 0.6 |
| 8 | n/a | n/a | $70 \leq E_3$ | n/a | 150 | 0.6 |
| 9 | n/a | $E_2 < 50$ | $85 \leq E_3$ | n/a | 250 | 1.0 |
| 10 | n/a | $50 \leq E_2 < 65$ | $85 \leq E_3$ | n/a | 250 | 1.0 |
| 11 | n/a | $65 \leq E_2 < 80$ | $85 \leq E_3$ | n/a | 250 | 1.0 |
| 12 | n/a | $80 \leq E_2$ | $90 \leq E_3$ | n/a | 250 | 1.0 |
| 13 | $E_1 < 75$ | $90 \leq E_2$ | $90 \leq E_3$ | n/a | 350 | 1.4 |
| 14 | $75 \leq E_1 < 85$ | $90 \leq E_2$ | $90 \leq E_3$ | n/a | 350 | 1.4 |
| 15 | $85 \leq E_1 < 95$ | $90 \leq E_2$ | $90 \leq E_3$ | n/a | 350 | 1.4 |
| 16 | $95 \leq E_1$ | $95 \leq E_2$ | $95 \leq E_3$ | n/a | 350 | 1.4 |

One problem with dustcake formation, in the case of surface loading filtration, is that dustcake can rapidly build up and quickly limit the lifespan of the filter. As a result, the filter ticles internally within the "depth" of the media. Depth media is loaded with particulates throughout the volume or depth occupied by the media.

In many filter media applications, and particularly high-flow-rate applications, a depth-loading media is chosen. Typically, depth-loading media comprises a relatively thick tangled collection of fiber material. A conventional depth-loading media filter is a deep (measured from inlet to outlet, compared to surface-loading media) and substantially constant-density media. Specifically, the density of the depth-loading media remains substantially constant throughout its thickness but for minor fluctuations in density as may be caused, for example, by compression and/or stretching around peripheral regions due to mounting of the media and the like. Gradient density depth-loading media arrangements are also known in which the density of the media varies according to a designed gradient. Different regions having different media density, porosity, efficiency and/or other characteristics can be provided over the depth and volume of the depth-loading media.

Depth-loading media is often characterized in terms of its porosity, density and solids content percentage. For example, a 5% solidity media means that about 5% of the overall volume comprises solids (e.g. fibrous materials) and the remainder is void space that is filled by air or other fluid. Another commonly used depth media characteristic is fiber diameter. Generally smaller diameter fibers for a given solidity percentage will cause the filter media to become more efficient with the ability to trap smaller particles. Smaller fibers can be packed together in greater numbers without increasing the overall solidity percentage, given the fact that smaller fibers take up less volume than larger fibers.

Because depth-loading media traps particulates substantially throughout the volume or depth, such media can be loaded with a higher weight and volume of particulates as compared with surface-loading medias over the lifespan of the filter. However, depth-loading medias tend to have lower efficiencies than surface-loading medias. To facilitate such high loading capacity, a low-solidity depth-loading media is often chosen for use. This may result in a large average pore size, which have the potential to allow some particulates to pass more readily through the filter. Gradient density systems and/or adding a surface-loading media layer can provide for improved efficiency characteristics. For example, a surface-loading media layer can be arranged in combination, for example, on the downstream surface of a depth-loading medium (or between upstream and downstream faces) to increase efficiency. This surface-loading media layer is sometimes referred to as a polish layer.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter for a cooling unit of an enclosure, the cooling unit adapted to receive fresh air into a housing of the cooling unit through an opening communicating with the external environment, the filter comprising:
   a structural support configured to be mounted to said housing;
   a gasket sealingly engaging the structural support and adapted to engage the housing; and
   a filter media supported by the structural support, the filter media being free of a membrane layer and including a fiber entanglement selected to prevent ingress of water sufficient to pass a salt fog test consistent with GR-487-CORE and in accordance with ASTM B 117.

2. The filter of claim 1, wherein the fiber entanglement is a depth-loading media comprising at least one deposition including melt-blown non-woven fibers.

3. The filter of claim 2, wherein the fiber entanglement is arranged upstream of a carrier substrate layer and forms an upstream filtration surface of the filter media, the melt-blown non-woven fibers providing a combination of depth filtration and moisture filtration, the carrier substrate layer providing a pleatability function, wherein the filter media is pleated.

4. The filter of claim 2, wherein the fiber entanglement is arranged downstream of a carrier substrate layer, the carrier substrate layer providing a first depth-loading filtration capacity, the melt-blown non-woven fibers providing a combination of a second depth filtration capacity of a higher efficiency that the first depth-loading filtration capacity in combination with moisture filtration.

5. The filter of claim 2, wherein the fiber entanglement comprises at least two depositions of melt-blown, non-woven fibers upon a carrier substrate layer.

6. The filter of claim 1, wherein the fiber entanglement has a mean flow pore pressure greater than 0.6 psi and a mean flow pore diameter less than 10 microns.

7. The filter of claim 1, wherein the filter media is selected to have at least a MERV 16 rating.

8. The filter of claim 1, wherein the filter media has a bubble point pressure greater than 0.3 psi.

9. The filter of claim 1, wherein the filter media is selected to have a pore size distribution with at least 50% of the pores having a size between 4 and 8 microns; and a pore size average diameter of between 5 micron and 7 microns; and wherein the filter media is selected to have less than 20 percent of cumulative filter flow through pores having a diameter of greater than 20 microns.

10. The filter of claim 1, wherein the fiber entanglement primarily includes melt blown polymeric fibers having a thickness of at least about ¼ millimeter, and wherein, wherein the fiber entanglement is laminated to a substrate providing a composite filter media that includes:
a thickness of between 1 and 3 millimeters;
an air permeability (cfm @0.5" $H_2O$) of between 15 and 40;
a basis weight of between 100 and 200 grams/$m^2$;
a pore size distribution such that more than 50 percent of the pores are from 5 to 8 microns in diameter and wherein a pore size distribution of the composite filter media is such that less than 20 percent of the pores are larger than 10.5 microns in diameter;
an efficiency greater than about 90 percent for particles from 0.30 to 0.40 microns in diameter;
an average synthetic dust weight arrestance greater than 96 percent, and wherein an ASHRAE dust holding capacity of the composite filter is greater than 0.75 grams per square foot;
a cumulative filter flow of 90 percent through the composite filter is achieved at an average pore diameter between 4 and 6 microns; and
wherein the smallest pore size in the composite filter media is less than four microns in diameter, greater than 5% of the pore sizes being less than 5 micron.

11. The filter of claim 1, wherein the fiber entanglement comprises a melt-blown polypropylene polymer supported by a carrier substrate layer; and wherein the carrier substrate layer comprises synthetic hydrophobic media.

12. The filter of claim 1, wherein the filter media is pleated to include a plurality of pleated tips, the pleat tips extending substantially vertically and in substantially horizontally spaced relation so as to act to drain moisture between pleats through gravity.

13. A filter, comprising:
a water and corrosion resistant rectangular frame adapted to provide for a panel filter;
a rectangular gasket sealingly engaging the rectangular frame; and
a filter media sealingly mounted into the rectangular frame, having a pleat depth of at least about 0.50 inches, the filter media being a composite media free of a membrane layer and including a carrier substrate layer and an efficiency fiber entanglement laminated thereto, the efficiency fiber entanglement including hydrophobic fibers providing the composite media with greater than a MERV 14 rating, the filter media being electrostatically charged to form an electret.

14. The filter of claim 13, wherein the fiber entanglement is a depth-loading media comprising at least one deposition including melt-blown non-woven fibers.

15. The filter of claim 14, wherein the fiber entanglement is arranged upstream of the carrier substrate layer and forms an upstream filtration surface of the filter media, the melt-blown non-woven fibers providing a combination of depth filtration and moisture filtration, the carrier substrate layer providing a pleatability function, wherein the filter media is pleated.

16. The filter of claim 14, wherein the fiber entanglement is arranged downstream of the carrier substrate layer, the carrier substrate layer providing a first depth-loading filtration capacity, the melt-blown non-woven fibers providing a combination of a second depth filtration capacity of a higher efficiency than the first depth-loading filtration capacity in combination with moisture filtration.

17. The filter of claim 14, wherein the fiber entanglement comprises at least two depositions of melt-blown, non-woven fibers upon the carrier substrate layer.

18. The filter of claim 13, wherein the fiber entanglement has a mean flow pore pressure greater than 0.6 psi and a mean flow pore diameter less than 10 microns.

19. The filter of claim 13, wherein the filter media is selected to have at least a MERV 16 rating.

20. The filter of claim 13, wherein the filter media has a bubble point pressure greater than 0.3 psi.

21. The filter of claim 13, wherein the filter media is selected to have a pore size distribution with at least 50% of the pores having a size between 4 and 8 microns; and a pore size average diameter of between 5 micron and 7 microns; and wherein the filter media is selected to have less than 20 percent of cumulative filter flow through pores having a diameter of greater than 20 microns.

22. The filter of claim 13, wherein the fiber entanglement primarily includes a melt blown polymeric fibers having a thickness of at least about ¼ millimeter, and wherein the fiber entanglement is laminated to a substrate providing a composite filter media that includes:
a thickness of between 1 and 3 millimeters;
an air permeability (cfm @0.5" $H_2O$) of between 15 and 40;
a basis weight of between 100 and 200 grams/$m^2$;
a pore size distribution such that more than 50 percent of the pores are from 5 to 8 microns in diameter and wherein a pore size distribution of the composite filter media is such that less than 20 percent of the pores are larger than 10.5 microns in diameter;
an efficiency greater than about 90 percent for particles from 0.30 to 0.40 microns in diameter;
an average synthetic dust weight arrestance greater than 96 percent, and wherein an ASHRAE dust holding capacity of the composite filter is greater than 0.75 grams per square foot;
a cumulative filter flow of 90 percent through the composite filter is achieved at an average pore diameter between 4 and 6 microns; and
wherein the smallest pore size in the composite filter media is less than four microns in diameter, greater than 5% of the pore sizes being less than 5 micron.

23. The filter of claim 13, wherein the fiber entanglement comprises a melt-blown polypropylene polymer supported by a carrier substrate layer; and wherein the carrier substrate layer comprises synthetic hydrophobic media.

24. The filter of claim 13, wherein the filter media is pleated to include a plurality of pleated tips, the pleat tips extending substantially vertically and in substantially horizontally spaced relation so as to act to drain moisture between pleats through gravity.

25. A filter for a telecommunications housing enclosing telecommunications electronics therein, the housing exposed to an outside environment, the filter comprising:
a generally rectangular frame;
a seal adapted to provide a seal between the frame and the housing; and
a pleated filter media extending within and across the frame to provide a pleated filter, the pleated filter media including a selected depth-loading filter medium having at least one layer adapted to filter mist and dust from air that may occur in the outside environment sufficiently to protect the telecommunications electronics from mist and dust, the depth loading filter medium being free of a membrane material;

wherein the depth-loading filter medium is selected to include: meltblown polymeric fibers, and having a depth of at least 0.25 millimeter, and a basis weight of at least 100 grams per square meter, wherein the depth-loading filter medium is selected to have an efficiency of greater than 90 percent for particles from 0.3 micron to 0.4 micron in diameter, an average fiber thickness of between 0.5 micron and 5 microns, and a variability in fiber thickness of at least 300%, further comprising a carrier substrate along one of the upstream and downstream sides of the depth-loading filter medium, the carrier substrate having an average fiber thickness of between 5 and 50 microns.

26. The filter of claim 25, wherein the filter passes at least one of the regular and aggravated salt fog tests.

27. A filter for a telecommunications housing enclosing telecommunications electronics therein, the housing exposed to an outside environment, the filter comprising:
   a generally rectangular frame;
   a seal adapted to provide a seal between the frame and the housing;
   a pleated filter media extending within and across the frame to provide a pleated filter, the pleated filter media including a selected depth-loading filter medium having at least one layer adapted to filter mist and dust from air that may occur in the outside environment sufficiently to protect the telecommunications electronics from mist and dust, the depth loading filter medium being free of a membrane material; and
   a carrier substrate along one of the upstream and downstream sides of the depth filter medium, the carrier substrate having an average fiber thickness of between 4 and 20 times the average fiber thickness of the depth-loading filter medium.

28. The filter of claim 27, wherein the filter passes at least one of the regular and aggravated salt fog tests.

29. A filter for a telecommunications housing enclosing telecommunications electronics therein, the housing exposed to an outside environment, the filter comprising:
   a generally rectangular frame;
   a seal adapted to provide a seal between the frame and the housing; and
   a pleated filter media extending within and across the frame to provide a pleated filter, the pleated filter media including a selected depth-loading filter medium having at least one layer adapted to filter mist and dust from air that may occur in the outside environment sufficiently to protect the telecommunications electronics from mist and dust, the depth loading filter medium being free of a membrane material;
   wherein the depth-loading filter medium has pores and is selected to include more than 50% of the pores from 4 to 8 microns in diameter, and wherein the filter media is selected to have at least a MERV 16 rating, wherein the depth-loading filter medium is selected to have a mean flow pore pressure greater than 0.6 psi, and a mean flow pore diameter less than 10 microns, and a bubble point pressure greater than 0.3 psi., and wherein the filter media has a dust holding capacity of at least 0.5 grams per square foot, and an air flow of at least 50 feet per minute.

30. The filter of claim 29, wherein the filter passes at least one of the regular and aggravated salt fog tests.

\* \* \* \* \*